(12) United States Patent
Bar-Tal et al.

(10) Patent No.: US 12,446,797 B2
(45) Date of Patent: Oct. 21, 2025

(54) PROBE-CAVITY MOTION MODELING

(71) Applicant: Biosense Webster (Israel) Ltd., Yokneam (IL)

(72) Inventors: Meir Bar-Tal, Haifa (IL); Erez Silberschein, Tel Aviv (IL); Liron Shmuel Mizrahi, Kiryat Bialik (IL); Alona Sigal, Beit Hanania (IL); Aharon Turgeman, Zichron Ya'acov (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 1047 days.

(21) Appl. No.: 17/188,844

(22) Filed: Mar. 1, 2021

(65) Prior Publication Data

US 2022/0183669 A1   Jun. 16, 2022

Related U.S. Application Data

(60) Provisional application No. 63/126,163, filed on Dec. 16, 2020.

(51) Int. Cl.
*A61B 5/08* (2006.01)
*A61B 5/06* (2006.01)
(Continued)

(52) U.S. Cl.
CPC ............... *A61B 5/08* (2013.01); *A61B 17/00* (2013.01); *A61B 18/1492* (2013.01);
(Continued)

(58) Field of Classification Search
CPC . A61B 5/08; A61B 17/00; A61B 2017/00699; A61B 5/28; A61B 5/02055; A61B 5/061; A61B 18/12; A61B 18/14; A61B 18/1492; A61B 34/20; A61B 5/068; A61B 5/0826; A61B 2017/00075; A61B 2018/00351; A61B 2018/00577; A61B 2034/105; A61B 2034/2051; A61B 2034/2053; A61B 2034/2072; A61B 5/062; A61B 5/0803; A61B 5/063; A61B 1/00004; A61B 1/00013; A61B 1/00045; A61B 1/00057; A61B 1/00165; A61B 1/0017; A61B 5/0059; A61B 5/0064;
(Continued)

(56) References Cited

U.S. PATENT DOCUMENTS 5,391,199 A   2/1995  Ben-Haim
5,443,489 A   8/1995  Ben-Haim
(Continued)

FOREIGN PATENT DOCUMENTS

WO   2013/036831 A1   3/2013

OTHER PUBLICATIONS

European Extended Search Report and Written Opinion dated May 4, 2022, for Application No. 21214608.8, 7 pages.
(Continued)

*Primary Examiner* — Jennifer Robertson
*Assistant Examiner* — Elina S Jang
(74) *Attorney, Agent, or Firm* — Frost Brown Todd LLP

(57) ABSTRACT

The present disclosure provides systems, apparatuses and methods that provide probe-cavity location and motion data based on probe location and respiration data.

17 Claims, 15 Drawing Sheets

(51) Int. Cl.
*A61B 17/00* (2006.01)
*A61B 18/00* (2006.01)
*A61B 18/14* (2006.01)
*A61B 34/20* (2016.01)
*G16H 20/40* (2018.01)
*G16H 50/00* (2018.01)
*G16H 50/50* (2018.01)

(52) U.S. Cl.
CPC .............. *A61B 34/20* (2016.02); *G16H 20/40* (2018.01); *G16H 50/50* (2018.01); *A61B 5/061* (2013.01); *A61B 5/062* (2013.01); *A61B 5/0803* (2013.01); *A61B 2017/00075* (2013.01); *A61B 2017/00699* (2013.01); *A61B 2018/00577* (2013.01); *G16H 50/00* (2018.01)

(58) Field of Classification Search
CPC ........... A61B 5/06; A61B 5/065; A61B 5/066; A61B 5/4887; A61B 6/12; A61B 8/00; A61B 8/48; A61B 18/082; A61B 34/30; A61B 34/37; A61B 34/71; A61B 34/77; A61B 90/39; A61B 90/96; A61B 90/98; A61B 5/7285; A61B 2017/00725; A61B 2034/2061; A61B 2034/301; A61B 2034/715; A61B 2034/741; A61B 2090/374; A61B 2090/376; A61B 2090/378; A61B 18/22; A61B 1/009; A61B 5/0536; A61B 5/0538; A61B 5/6852; A61B 5/285; A61B 5/287; A61B 5/4233; A61B 1/00006; A61B 1/2676; A61B 5/0816; A61B 5/6867; A61B 10/04; A61B 34/32; A61B 34/35; A61B 34/76; A61B 5/7207; A61B 5/7275; A61B 5/7289; A61B 2034/303; A61B 2017/00809; A61B 2034/2048; A61B 2034/2063; A61B 2090/3614; A61B 2090/371; A61B 34/10; A61B 2017/00123; A61B 90/06; A61B 90/08; A61B 2017/00026; A61B 2090/067; A61B 2090/0811; A61B 2017/00053; A61B 2090/061; G16H 20/40; G16H 50/50; G16H 40/63; G16H 50/00; G01B 11/165; G01L 1/242; A61M 2025/0166; A61M 25/0105; G06T 15/00; G06T 19/003; G06T 2200/24; G06T 2210/41; G06T 7/277; G06T 2207/10076; G06T 2207/10124; G06T 2207/10136; G06T 2207/20076; G06T 2207/20081; G06T 2207/30096; G06T 5/70; G06T 7/70; G06T 2207/30021; G06V 2201/034

See application file for complete search history.

(56) References Cited

U.S. PATENT DOCUMENTS

| | | | |
|---|---|---|---|
| 5,558,091 | A | 9/1996 | Acker et al. |
| 5,944,022 | A | 8/1999 | Nardella et al. |
| 5,983,126 | A | 11/1999 | Wittkampf |
| 6,172,499 | B1 | 1/2001 | Ashe |
| 6,177,792 | B1 | 1/2001 | Govari et al. |
| 6,456,864 | B1 | 9/2002 | Swanson et al. |
| 6,690,963 | B2 | 2/2004 | Ben-Haim et al. |
| 6,788,967 | B2 | 9/2004 | Ben-Haim et al. |
| 6,892,091 | B1 | 5/2005 | Ben-Haim |
| 2001/0007940 | A1* | 7/2001 | Tu ...................... A61B 18/1492 606/41 |
| 2007/0167801 | A1 | 7/2007 | Webler et al. |
| 2010/0268059 | A1 | 10/2010 | Ryu et al. |
| 2012/0029504 | A1* | 2/2012 | Afonso .............. A61B 18/1492 606/34 |
| 2012/0197111 | A1* | 8/2012 | Bar-Tal ................. A61B 5/721 600/424 |
| 2016/0262655 | A1* | 9/2016 | Bar-Tal ................ A61B 5/7282 |
| 2018/0055576 | A1* | 3/2018 | Koyrakh ................ A61B 5/113 |
| 2018/0344392 | A1* | 12/2018 | Montag ................ A61B 5/4836 |

OTHER PUBLICATIONS

European Communication dated Feb. 21, 2024, for Application No. 21214608.8, 4 pages.

European Communication dated Nov. 6, 2024, for Application No. 21214608.8, 4 pages.

* cited by examiner

PROBE-CAVITY MOTION MODELING

CROSS REFERENCE TO RELATED APPLICATION

This application claims the benefit of U.S. Provisional Patent Application No. 63/126,163, filed on Dec. 16, 2020, which is incorporated by reference as if fully set forth herein.

FIELD OF INVENTION

The present application provides systems, apparatuses, and methods for modeling motion of a probe or catheter.

BACKGROUND

Surgical procedures involving cavities or chambers, such as the heart, require accurate information regarding a position of the probe or catheter in the cavity. In one aspect, mapping of a heart chamber is critical in order to identify issues regarding cardiac arrhythmia (e.g., atrial fibrillation (AF)), which can be treated via intra-body procedures.

Respiration is divided into breathing in (inhalation or inspiration) and breathing out (exhalation or expiration). Due to human physiology, the diaphragm moves up and down during this process and displaces the heart in a cyclical manner. During the expiration phase, there is a moment called the end-expirium phase in which this displacement from the diaphragm is minimal for a period of time.

Currently, site stability, i.e. the stability of a probe or catheter relative to a chamber or cavity wall, is based on end expirium locations. Due to this configuration, the site stability data can only be updated once every five to eight seconds based on the normal respiration cycle for humans and the end expiriums. Any start or end stability that happens between two consecutive end expiriums will only be indicted at a later time. Additionally, the exact start or break time may sometimes deviate. Accordingly, short and sharp movements that happen in between end expiriums may be missed altogether resulting in tagging one long ablation site instead of the two shorter ones.

SUMMARY

In one aspect, the present disclosure provides systems, processes and methods that estimate the probe-chamber motion while inside a chamber in real-time by continuously assessing and accounting for respiration motion based on a measured location of the probe. In one aspect, the probe motion is determined based on compensating respiration motion from the measured location of the probe.

In one aspect, a site stability process and system are disclosed herein that identifies time segments when the probe is stable relative to a chamber or vessel wall, which allows for further analysis.

BRIEF DESCRIPTION OF THE DRAWINGS

A more detailed understanding can be had from the following description, given by way of example in conjunction with the accompanying drawings wherein.

DETAILED DESCRIPTION

As disclosed herein, systems, apparatuses and methods are provided that determine or estimate motion of a probe while inside of a chamber by accounting for respiration motion. The term probe is used interchangeably with the term catheter herein, and one skilled in the art would understand that any type of location sensing device could be implemented with the configurations disclosed herein.

Figure 1:
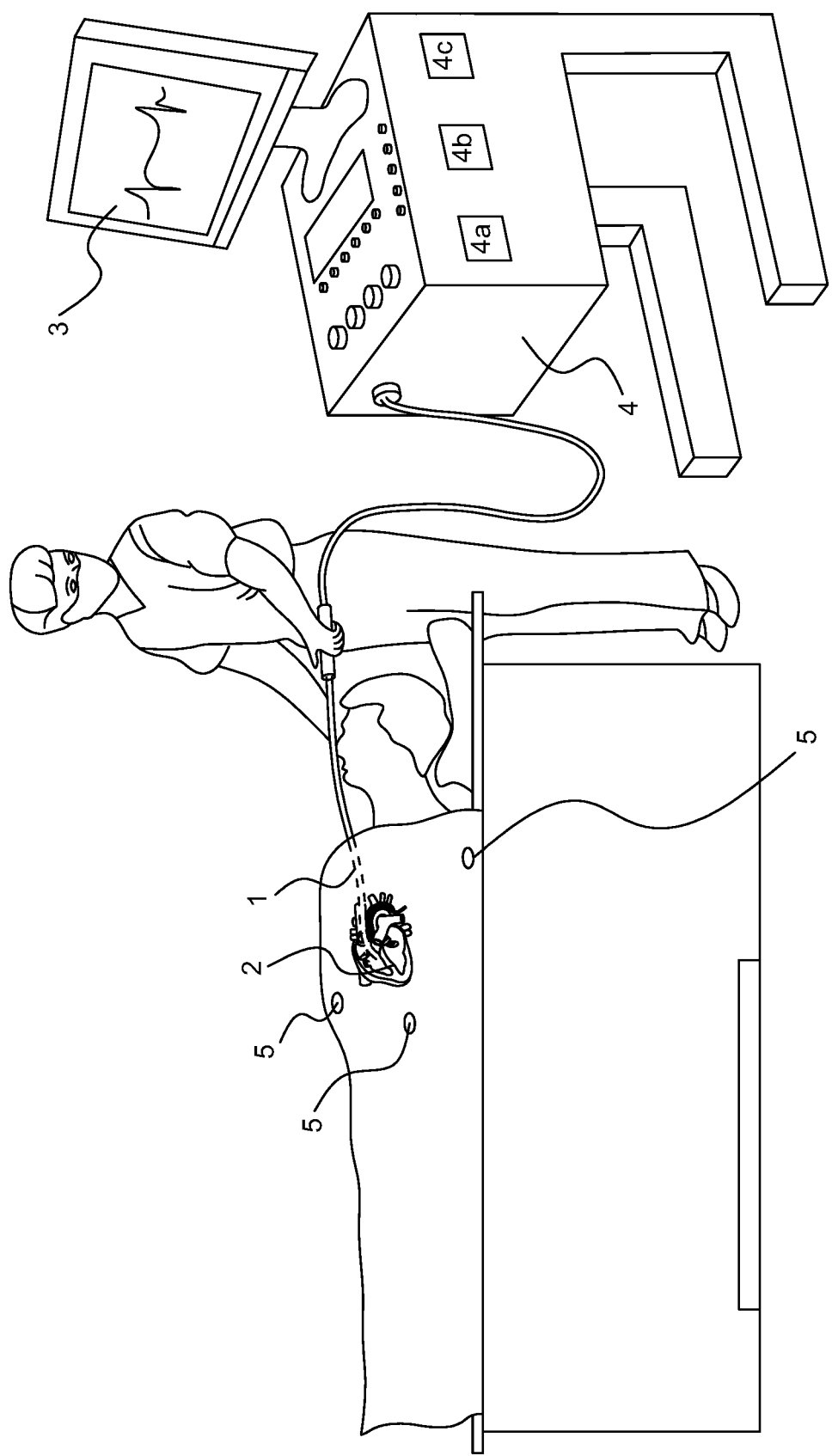
FIG. 1 illustrates an exemplary system according to one embodiment.

FIG. 1 illustrates one embodiment for implementing aspects of the disclosed subject matter. As shown in FIG. 1, a surgeon is navigating a probe or catheter 1 relative to a patient. In one embodiment, the surgeon is navigating the catheter 1 within a patient's heart 2. On a monitor 3, the surgeon can view various data sets and models related to respiration, absolute catheter motion and location, and catheter-heart motion and location. These data sets are shown in more detail in FIG. 2.

A computing system 4 is provided that is configured to implement the various processes and algorithms disclosed herein. The computing system 4 can include a control unit 4a, a processor 4b, and a memory unit 4c. The control unit 4a can be configured to analyze signals from the catheter 1 and sensors to determine coordinates and positions of the catheter 1 as well as various other information. The memory unit 4c can be of various types, and is generally configured to track position data, respiration data, time data, and other types of data regarding the catheter 1 and the sensors. The computing system 4 can be configured to implement any of the steps, processes, methods, configurations, features, etc., that are disclosed herein.

In one aspect, sensors 5 are attached directly to the patient's body. In one embodiment, the sensors 5 are patches that are configured to detect magnetic and/or electrical signals. One skilled in the art would understand based on the present disclosure that the embodiments disclosed herein are not limited to a heart and can be implemented to analyze any type of body part or organ. In one aspect, the sensors 5 can be configured to measure inter-impedance among the sensors 5.

In another aspect, at least one single-axis magnetic sensor mounted on the catheter tip is configured to work in conjunction with at least one external magnetic sensor in a patient pad (i.e. under the patient). In one embodiment, there are three magnetic sensors mounted on the catheter that are oriented in three different directions (i.e. spaced 120 degrees apart) and that are configured to work in conjunction with three external magnetic sensors. Details of such technique are provided in the following documents: U.S. Pat. Nos. 5,391,199, 5,443,489, 5,558,091, 6,172,499, 6,177,792, 6,690,963, 6,788,967, and 6,892,091, which are each incorporated by reference as if fully set forth herein.

In another aspect, an impedance sensor on the catheter is provided that is configured to be used without any external sensors. Details of such technique are provided in the following documents: U.S. Pat. Nos. 5,944,022, 5,983,126, and 6,456,864, which are each incorporated by reference as if fully set forth herein. As used herein, the term sensor refers to any of the sensor arrangements described herein, whether the sensor is integrated with the catheter, or includes a combination of a sensor integrated with the catheter and additional sensors, such as external sensors.

Regardless of the sensor arrangement, these sensors assist with modeling a patient's respiratory cycle, and identifying when a patient's lungs are breathing in or out. In one embodiment, when the lungs inflate or fill with air, then the impedance increases. The sensors can also generate a magnetic field, and this magnetic field can be used to detect the absolute position of the catheter 1. One skilled in the art would understand from the present disclosure that various methods and sensors can be used to determine a patient's respiratory cycle or the catheter's position. The respiration motion gathered from the sensors can be used to generate an ellipsoid (i.e. element 20 in FIG. 2) that provides a model of the respiration cycle.

Figure 2:
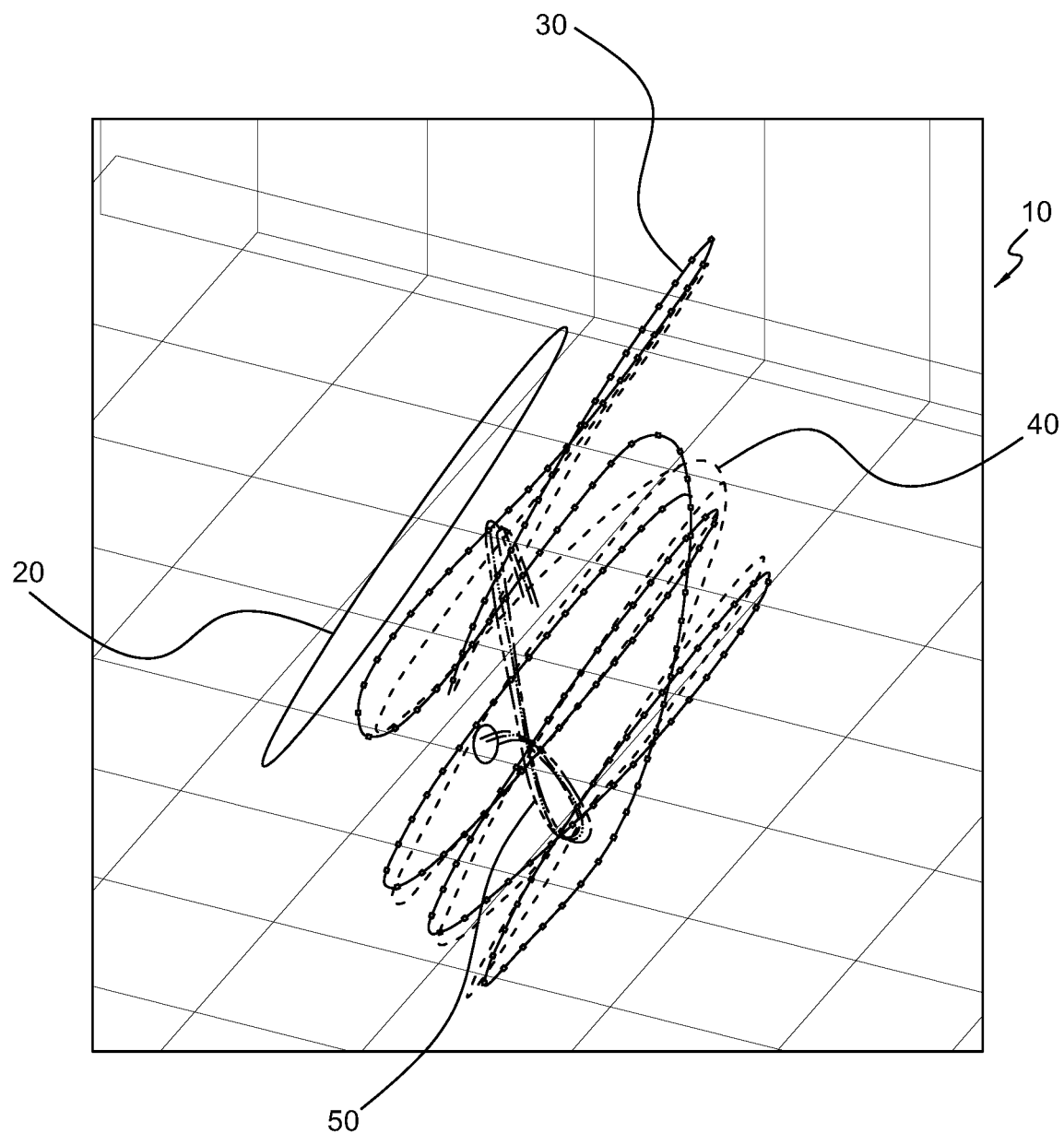
FIG. 2 is an example image produced using the disclosed embodiments.

FIG. 2 illustrates an exemplary image 10 including data regarding respiratory motion 20, catheter motion 30, reconstructed motion 40, and in-heart motion 50. This information is configured to be displayed on monitor 3. Each of these components are described in more detail herein.

The term respiratory motion 20 refers to motion that is based on respiration data, which can be gathered or collected in various ways. For example, in one embodiment, probes, sensors, or patches (such as sensors 5 in FIG. 1) are attached to a patient's body or sensors are integrated with the catheter 1 that may be used in conjunction with external sensors 5. This data reflects the changes in volume of a patient's lungs. The respiration motion 20 can be based on movement of a patient's diaphragm during breathing. The signal can be extracted by placing electrodes on a body surface. In one embodiment, the respirator motion 20 is based on electrical signals between probes on a body surface. In another aspect, the probes can measure displacement of one portion of the body relative to another portion of the body. This information is collected and further processed using the processes disclosed herein. In one aspect, a primary or major signal is generated by the sensors. This primary or major signal is then further processed and a derivative of the signal is determined. Respiration indicators and respiration vectors related to the respiratory motion 20 are described herein.

The catheter motion 30, which is also known as probe or sensor motion or original catheter motion, illustrated in FIG. 2 reflects data regarding an absolute position of the catheter 1. This data can be generated using any known tracking or sensing configuration for a catheter, probe, sensor, etc. In one aspect, sensors are used to generate a magnetic field and detect the position of the catheter 1. For example, catheter motion data can be obtained using magnetic transmitters external to a patient that generate signals based on a position of the catheter 1. In one aspect, the sensor configuration includes at least three magnetic sensors oriented in three different directions from each other that are mounted on a tip of the catheter and work in conjunction with a plurality of sensors that are external to the patient. In another aspect, an impedance sensor is provided and does not require any external sensors. The catheter motion data can be further processed via any combination of filters, smoothing, or post-acquisition signal processing.

The reconstructed motion 40 of FIG. 2 is a control element in one aspect. In other words, the reconstructed motion 40 is generated in order to provide a validity and error check whether there is an undesirable amount of difference between itself and the original catheter motion 30. In one aspect, the reconstructed motion 40 is equal to the respiration motion 20 plus the original catheter motion 30. An error variable, also referred to as ERR and described in more detail herein, can be determined based on the reconstructed motion 40 from the original catheter motion 30. Such determination based on the reconstructed motion 40 can be by subtraction or addition to the original catheter motion 30.

The in-heart motion 50 is also referred to as the catheter-heart motion or probe-cavity motion. In one aspect, the in-heart motion 50 is measured in millimeters, but can be measured used any metrics. This motion data can generically refer to any type of motion data for a probe, catheter, or sensor relative to any wall or chamber of a chamber. This data can ultimately be used to determine site stability, specifically relating to ablation in a patient's heart. The in-heart motion 50 is typically important for a surgeon due to this information indicating when the catheter is stable relative to the heart chamber wall. With the in-heart motion 50, it is possible to find a stability point, also known as a stability location or site. This information is important for determining various parameters regarding an ablation lesion, such as location, size, etc. During breathing, it is generally assumed that the catheter and the heart are moving up and down based on the diaphragm contracting. If the catheter is not stable relative to the heart wall or boundary (i.e. the catheter is not in contact with the heart wall or boundary) during ablation, then the ablation will likely not be successful or ablate the desired targeted location. In one aspect, the present disclosure is directed to providing more reliable and accurate mapping of in-heart motion 50 (i.e. catheter-heart motion or probe-cavity motion) based at least in part on respiration motion and other features, which addresses issues associated with any sudden movements occurring between end expiriums. In other words, by providing more accurate information regarding the relative position of the catheter and the cavity boundary, any movement that occurs between end expiriums can be accounted for by a surgeon and used to facilitate decisions regarding ablating procedures.

In one aspect, the systems, methods, and processes are based on the following three features: (1) signal processing, (2) respiration compensation, and (3) station finding or site stability location. One skilled in the art would understand that any one or more of these features can be used independent from the other features. For example, features (1) and (2) can be implemented without feature (3). In another aspect, feature (3) is specifically implemented in order to procedures involving the heart, and specifically involving ablation of specific areas of the heart. Any of the features described herein can used or adapted for determining aspects of chambers, and are not specifically limited to only being implemented with respect to heart chambers (i.e. navigation in the lungs).

In one aspect, signal processing includes converting respiration indicators (RI) into a main respiration signal and its derivative, i.e. respiration vectors (RV). The respiration data is gathered based on the sensors in one embodiment, which can either include a catheter integrated with a sensor, external sensors, or any combination thereof. In one aspect, before converting RI to RV, ablation effects are accounted for with ablation offset corrections, and low-pass filtering can be used to reduce heartbeat movement. In one aspect, the disclosed subject matter is based on decomposing catheter motion into two components: respiration motion and catheter-heart motion. Respiration motion is generally assumed to be correlated to RV via a correlation matrix A.

The catheter-heart motion is assumed to be a smoothed motion and can be modeled via a spline curve. Based on the foregoing, Equation 1 is provided:

$$\text{Measured Motion} = \text{Respiration Motion}(A \times \text{RV}) + \text{Catheter-Heart Motion} + \text{ERR} \qquad \text{(Equation 1)}$$

Here, the correlation matrix A and the spline parameters are incrementally and simultaneously tuned in order to minimize root mean square (RMS) deviation between the measured motion after lower pass and the reconstructed motion in order to minimize the error.

In one aspect, the correlation matrix A is regressed in step n to match the respiration motion of step n−1, which is the total motion minus in-heart motion in step n−1. In other words, A is regressed in a current state to match the respiration motion of an earlier state, and the respiration motion is equal to the total motion minus the in-heart motion in the earlier state.

The correlation matrix A is a two-row by three-column data set. The correlation matrix A is configured in one aspect to transform two-dimensional RV into an ellipsoid in three-dimensional space. The matrix values are tuned or selected so as to adapt by multiplication the RV values to the respiration ellipsoid size (i.e. in mm). In one aspect, the RV values are relatively small (i.e. $1 \cdot e^{-3}$) and these are multiplied by large values (i.e. 3,000) in the A matrix to create movement (i.e. 3.0 mm movement) in the three-dimensional space.

Regarding the respiration motion, in one aspect, there are five RI channels. One skilled in the art would understand that the number of RI channels can vary. The RI generally indicate lung motion and changes in lung volume over time. The RI generally each contain similar signals and noise. In one aspect, the RI are collected by attaching a plurality of probes to directly to a patient. For example, six patches or probes can be attached to a patient. Electrical signals between the six patches or probes are measured and the RI are generated. The RI is generally provided in mV in one embodiment.

Filters can be applied to the RI in order to remove noise or other elements. For example, a low pass finite impulse response (FIR) filter can be used to remove an imprint of the heartbeat on the RI signals. This step uses a 151-weight vector that is multiplied by 151 elements on each channel of raw data to produce one sample of filtered data, in one aspect. In other words, the filter multiplies the corresponding sample in a sliding window manner. One skilled in the art would understand that these parameters can vary.

The singular value decomposition (SVD) can be used to find the weights that select the most prominent respiration signal if multiplied by the measure five RI. This filtering step and processing step provides a smoother output signal and eliminates undesirable noise and disruptions caused by the heartbeat.

Based on the RI, a main respiration vector is extracted. In one aspect, this extraction is performed by calculating the first Eigenvector in SVD.

Generally, the SVD is configured to extract the most prominent common motion out of several similar respiration dependent signals. The common signal is found as a linear combination of the individual RI signals. In one aspect, to verify consistency of the linear weights, the SVD is done three times, including a first one on the first 30 seconds, a second one on the second 30 seconds, and third one on the entire 60 seconds of the RI buffer. In the event that the three sets of weights are similar enough, then the last set is selected. In other words, the similarity here refers to the V from the SVD. This V then becomes a weight vector, i.e. the RI2RV weights vector. In one aspect, the similarity parameter has a Pearson correlation of at least 0.5.

In one aspect, this process involves determining the first Eigenvector in the SVD of five RI signals over several respiration cycles. For example, a sixty second buffer can be used, which can correspond to ten respiration cycles. By using multiple cycles, it can be assured that the RI signals are accurate and reliable.

The disclosed subject matter also adds a phase shifted signal to provide ellipse-like motion or a model, shown by the estimated respiration motion 20 in FIG. 2. This phase shifted signal is computed by finding the derivative of the RI signals and combining the derivative using the same weights. This process is analogous to a phase shift between a Cos(x) function and Sin(x) function.

In one aspect, respiration vectors (RV) are produced based on the main respiration vector and a derivative of the main respiration vector. In other words, the five RI are processed using the steps disclosed herein to produce or determine two RV. Once these RV are determined, the following equation is provided:

$$\text{Measured Motion} = \text{Respiration Motion}(A \times \text{RV}) + \text{Catheter-Heart Motion} + \text{ERR} \qquad \text{(Equation 2)}$$

Equation 2 is generally similar to Equation 1 except Equation 2 uses RV instead of RI.

In order to determine the catheter location, raw location data regarding the catheter is filtered. In one aspect, the raw location data is filtered using the same low pass FIR filter that was applied to the RI signals to remove the heartbeat motion. As a result of the processing, synched and filtered respiration vectors and the catheter location are generated.

In summary, at the end of signal processing, the processes disclosed herein provides signals 20 and 30 in FIG. 2.

This feature generally includes estimating a correlation matrix A and spline parameters that represent the catheter's actual motion. The two RV are then transferred into a three-dimensional space.

Regarding the RV, the processes disclosed herein generally transfer this 2D vector into a 3D ellipse or ellipsoid in 3D space, as shown by element 20 in FIG. 2. The ellipse drawn in FIG. 2 can be oriented in any direction, and the main purpose of compensating for respiration involves modeling movement of a patient's breathing on the catheter or probe.

The correlation matrix A (also referred to as the transformation matrix) converts the two-dimensional vector into a three-dimensional ellipsoid. The correlation matrix A is determined based on regression, in one aspect. The root mean square error (RMSE) is minimized between the modeled motion (i.e. respiration motion+catheter motion) and the measured motion to provide the correlation matrix A.

Figure 3:
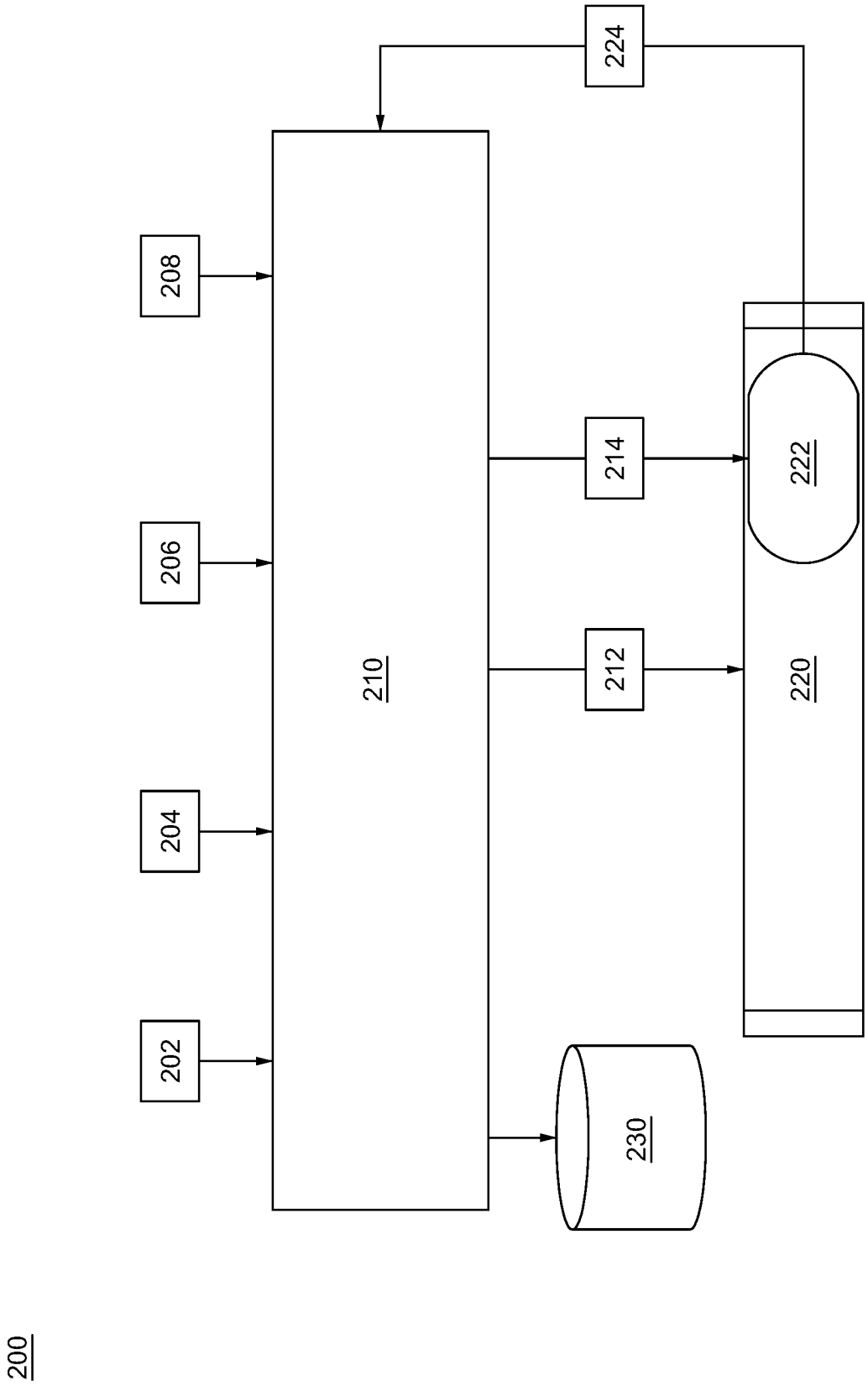
FIG. 3 is a schematic diagram illustrating a system according to one aspect.

As shown in FIG. 3, a system 200 is disclosed that includes a site stability module 210. This system 200 can be implemented, integrated, or configured to interface with the computing system 4 shown in FIG. 1. The term module, as used herein, can refer to any computational component or interface, and can include any hardware component or software component.

The site stability module 210 can include any one or more of the features disclosed herein. In one aspect, the site stability module 210 is configured to receive data from various inputs. For example, location data 202, respiration indicator data 204, status data 206 (such as location status and status of the RI), and initialization or algorithm parameters 208 can each be provided to the site stability module 210. In one embodiment, the data is provided streaming in 16.67 ms intervals. One skilled in the art will understand based on this disclosure that the data steaming parameters and cycles or periods can vary.

From the site stability module 210, session stability time segments 212 (i.e. start-end segments) and the catheter-heart location data 214 are transmitted to a central module 220. In other words, the site stability module 210 provides output parameters that include the last stability segment parameter and parameters of the last set of sites in the last ablation session. In one aspect, stability is a segment of duration of three seconds or greater in which the catheter-heart speed is below a certain speed threshold. The site is part of the stable segment during ablation time, and a segment of stability during ablation can be divided into several sites.

In one embodiment, the central module 220 can include any centralized computing system configured to receive, process, and/or transmit data to and from the site stability module 210. In one example, the central module 220 is a CARTO VISITAG™ processing unit. One skilled in the art would understand that various types of configurations can be provided that are in communication with the site stability module 210.

At the central module 220, compensated location data 222 for each session can be saved and stored. This data 222 can be further processed, filtered, etc. at the site stability module 210. A recordation module 230 can optionally be provided. The recordation module 230 can be configured to assist with debugging and post analysis. Element 224 in FIG. 3 represents a recalculation step in which information from the central module 220 is continuously provided back to the site stability module 210 in order to refine and recalculate information regarding site stability.

Figure 4A:
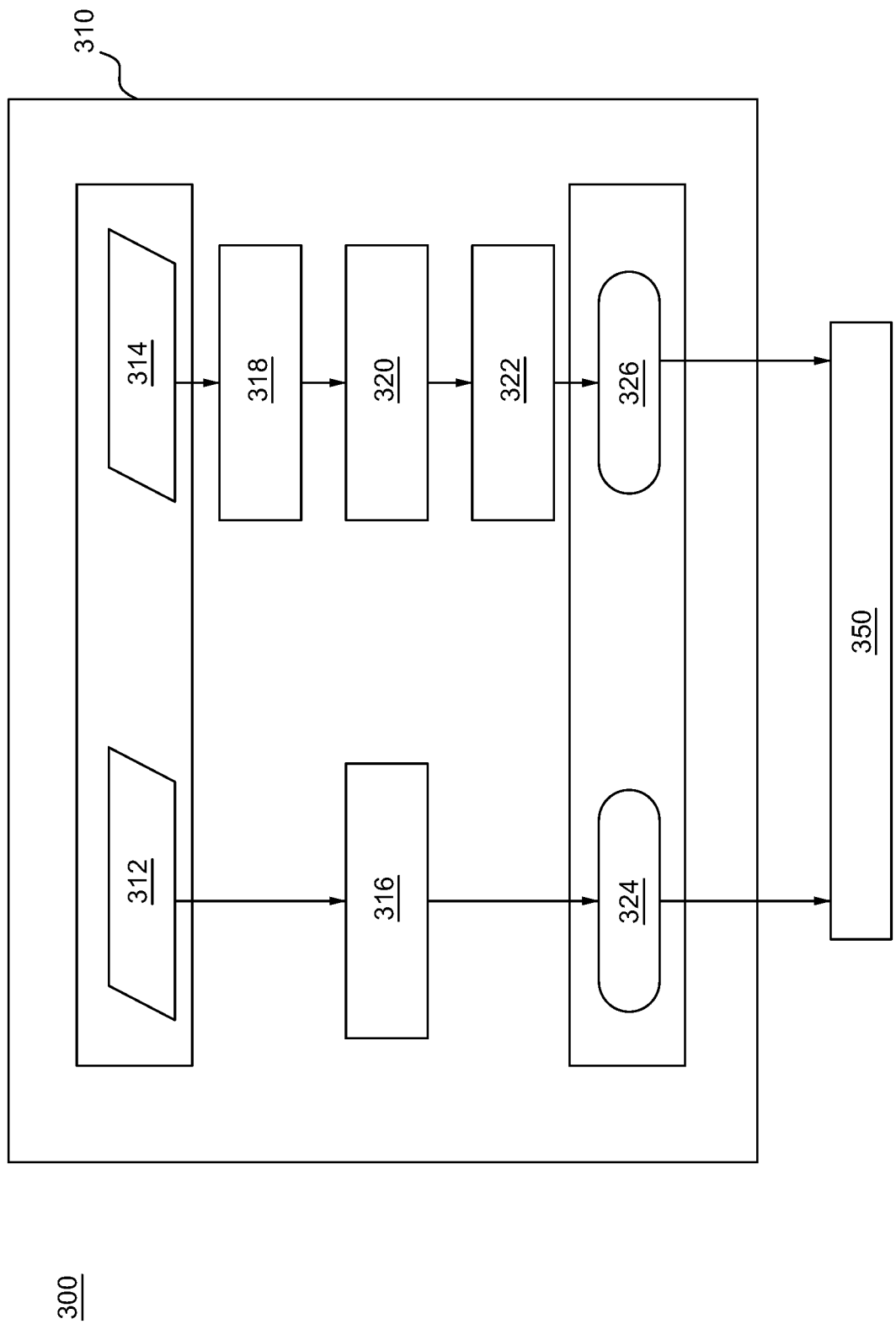
FIG. 4A is a first portion of a flow diagram showing aspects of the disclosed embodiments.
Figure 4B:
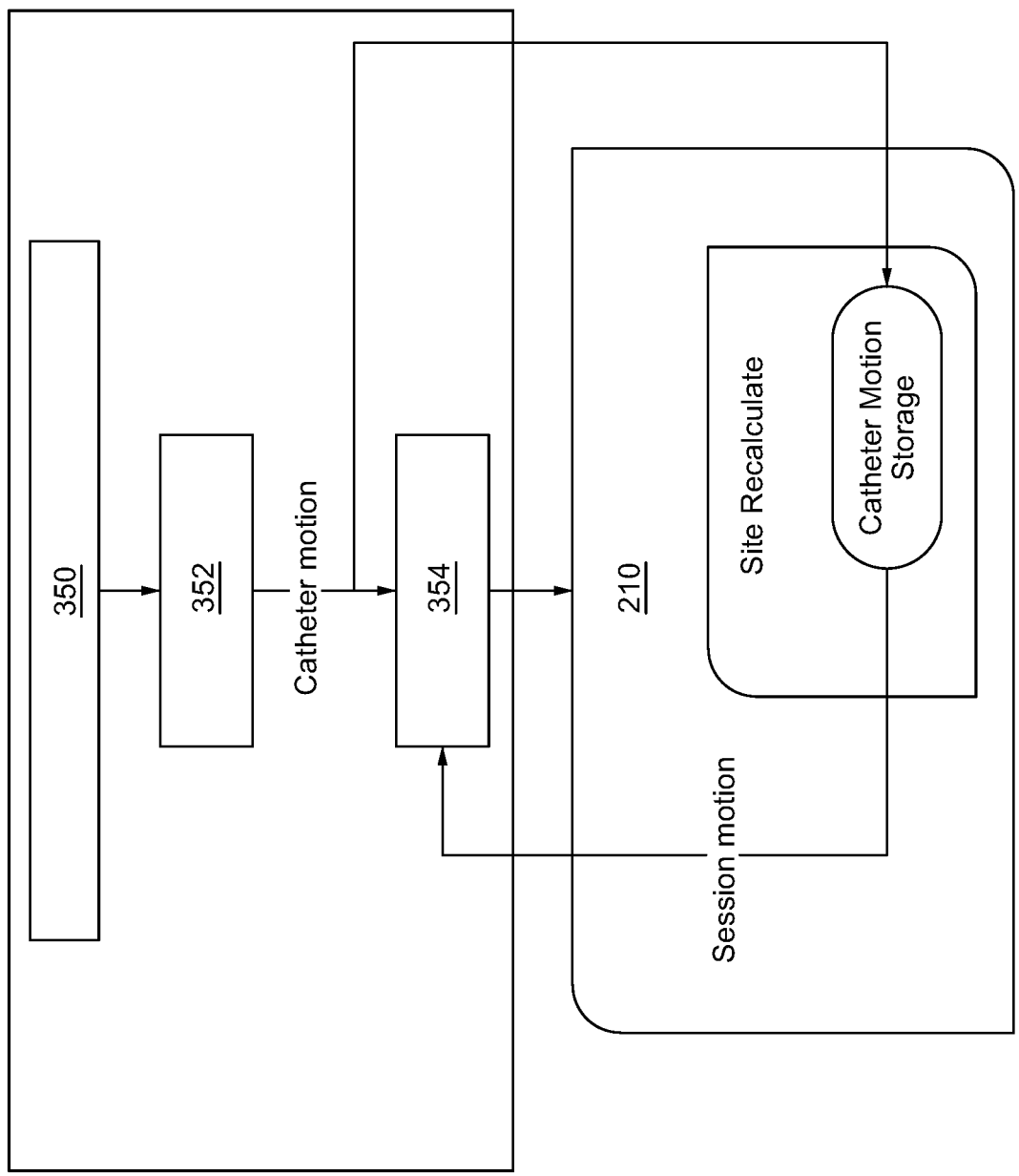
FIG. 4B is a second portion of the flow diagram from FIG. 4A.

Referring to FIGS. 4A and 4B, a flow diagram is provided to illustrate various steps of process 300. As shown in FIGS. 4A and 4B, the process 300 generally includes a pre-processing phase 310 and a stability detection phase 330. In the pre-processing phase 310, location data 312 and the RI 314 is provided. In other words, the pre-processing phase 310 includes at least two groups of channels: the location channels, and the RI channels. This data can be set or generated in relatively small increments. For example, the data can be set at least every 16.67 ms.

The location data 312 is further processed. For example, the location data 312 can be processed by applying a low pass filter or low pass FIR filter at step 316. After this step, the filtered location, i.e. the last filtered location, is determined at step 324.

Figure 5:
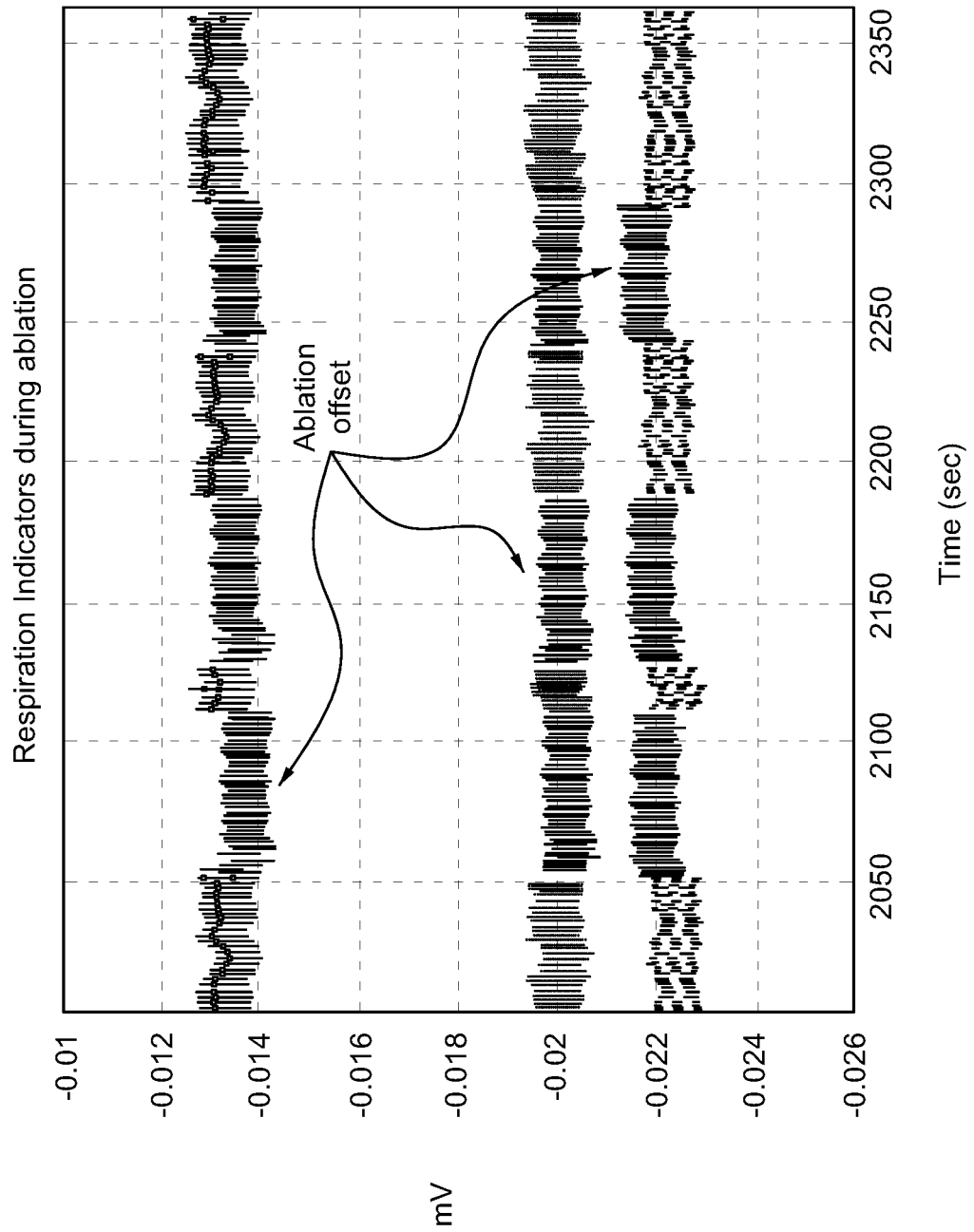
FIG. 5 is a graph illustrating respiration indicator signals during ablation.

The RI 314 can also be further processed through a series of steps or processes 318, 320, and 322. As shown in FIG. 3A, the RI 314 can first be analyzed for ablation corrections at step 318, which accounts for any offset caused by the ablator. The offset from the ablator affects the ability to estimate respiration motion. Accordingly, reducing the effect of the offset provides an accurate output regarding the RI 314. In one aspect, an ablation offset correction factor is determined by measuring RI signals prior to ablating and during ablating. Whenever the ablator is turned on, then the estimated offset per channel is compensated (e.g., subtracted or added) from the RI signals. The offset is estimated based on the RI signal change between the RI signals measured just before ablation starts to the RI signals measured just after the ablator start. The effect of the ablation offset is shown in FIG. 5, which illustrates an ablation offset by the shift in the RI during ablation.

Returning to FIG. 4A, the data is filtered at step 320. In one embodiment, the filters include a low pass filter and a derivative filter. In one embodiment, the low-pass filter and derivative filters are configured as FIR filters with 151 sample kernel. In one aspect, preprocessing includes the following steps. First, the original five RI channels are obtained. Second, ablation offset correction is performed. Third, low-pass and derivative pass filters are performed to create filtered respiration indicators (FRI) and derivative respiration indicators (DRI) using a sliding window of 151 samples of FIR filter. Fourth, the SDV is performed to find the most prominent weights. Fifth, the most prominent weights are implemented on the FRI to obtain RV(1) and on the DRI to obtain RV(2). One skilled in the art would understand that additional filters can be used and additional steps may be implemented.

Figure 6:
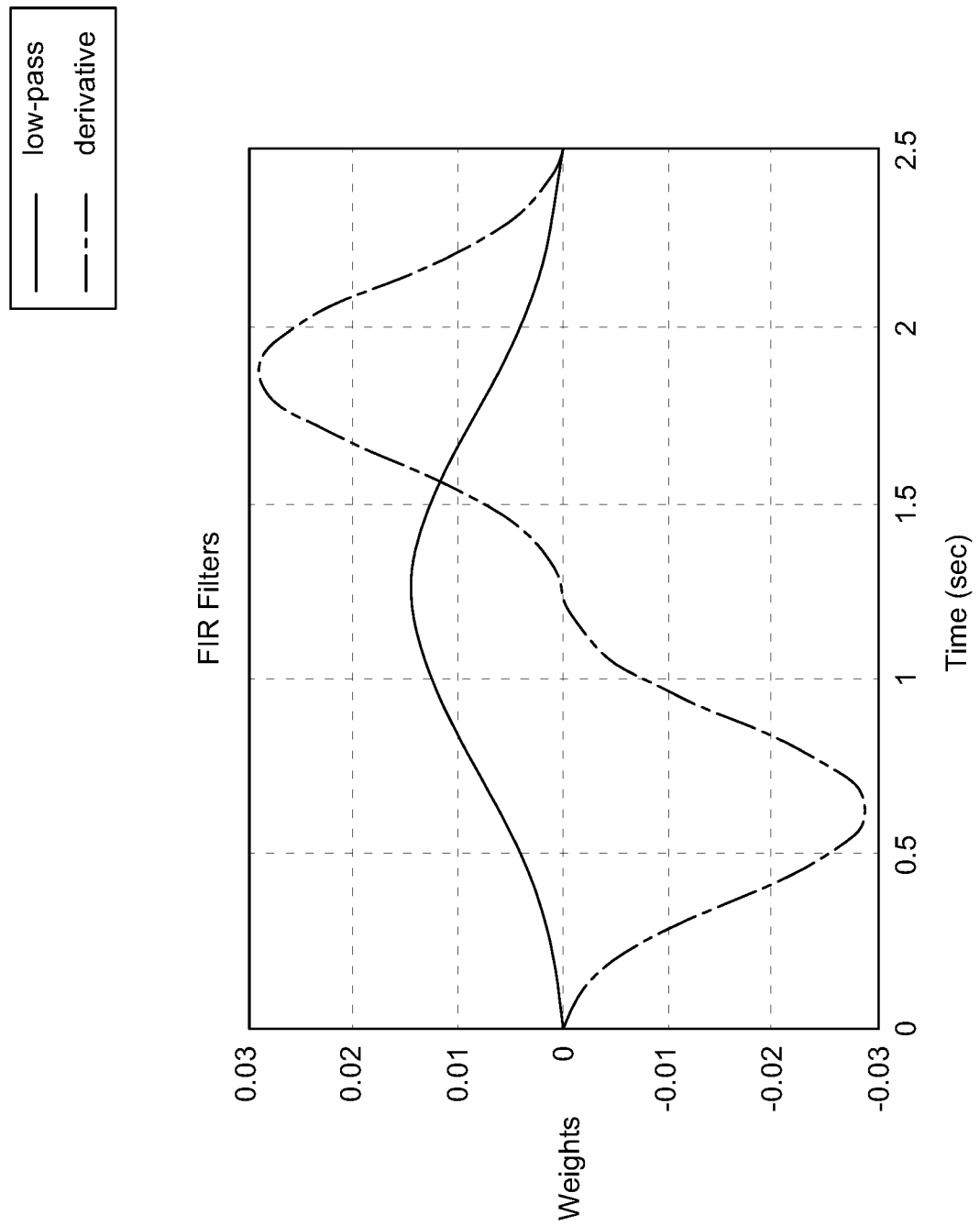
FIG. 6 is a graph illustrating an exemplary low pass and derivative filter with respect to weights.

FIG. 6 illustrates one example of filters that can be used at step 320, and illustrates the weights for a low pass filter and for its derivative signal. As shown in FIG. 6, different weighted factors are applied over time for the low-pass filter and the derivative filter.

The data regarding the RI 314 is further processed at step 322 by calculating the first Eigenvector of the RI 314 and by calculating the derivative of the first Eigenvector of the RI 314. The SVD is used to find the first Eigenvector of the filtered RI in order to reduce redundancy and noise. The mean compensated (e.g., subtracted or added) filtered respiration indicators (FRI) and the derivative respiration indicators (DRI) can be stored. In one embodiment, this information is stored in one minute buffers. One skilled in the art would understand that the buffer duration can vary.

In one aspect, the SVD is only performed once at the beginning of a predetermined period when the buffers are full with a valid signal. The SVD produces five coefficients of a first Eigenvector (V1), and the five coefficients are used to produce the respiration vectors (RV) at step 326. In one embodiment, the RV equal is equal to FRI×V1, DRI×V1.

At the end of the pre-processing phase 310, the last minute of the RV data (produced at step 326) and the filtered location data produced at step 324, are synchronized and stored in the last-minute buffer.

Data from steps 324 and 326 is provided to the stability detection phase 350. During the stability detection phase 350, motion decomposition 352 is carried out. More detail regarding motion decomposition is provided by FIG. 7B. From motion decomposition 352, the process includes calculating site stability and sites 354. This step provides data back to a site stability module 210, which is configured to receive catheter motion data and provide session motion data. Information regarding catheter motion and site information is stored with the site stability module 210. Site stability parameters can be recalculated based on the information provided to the site stability module 210.

Figure 7A:
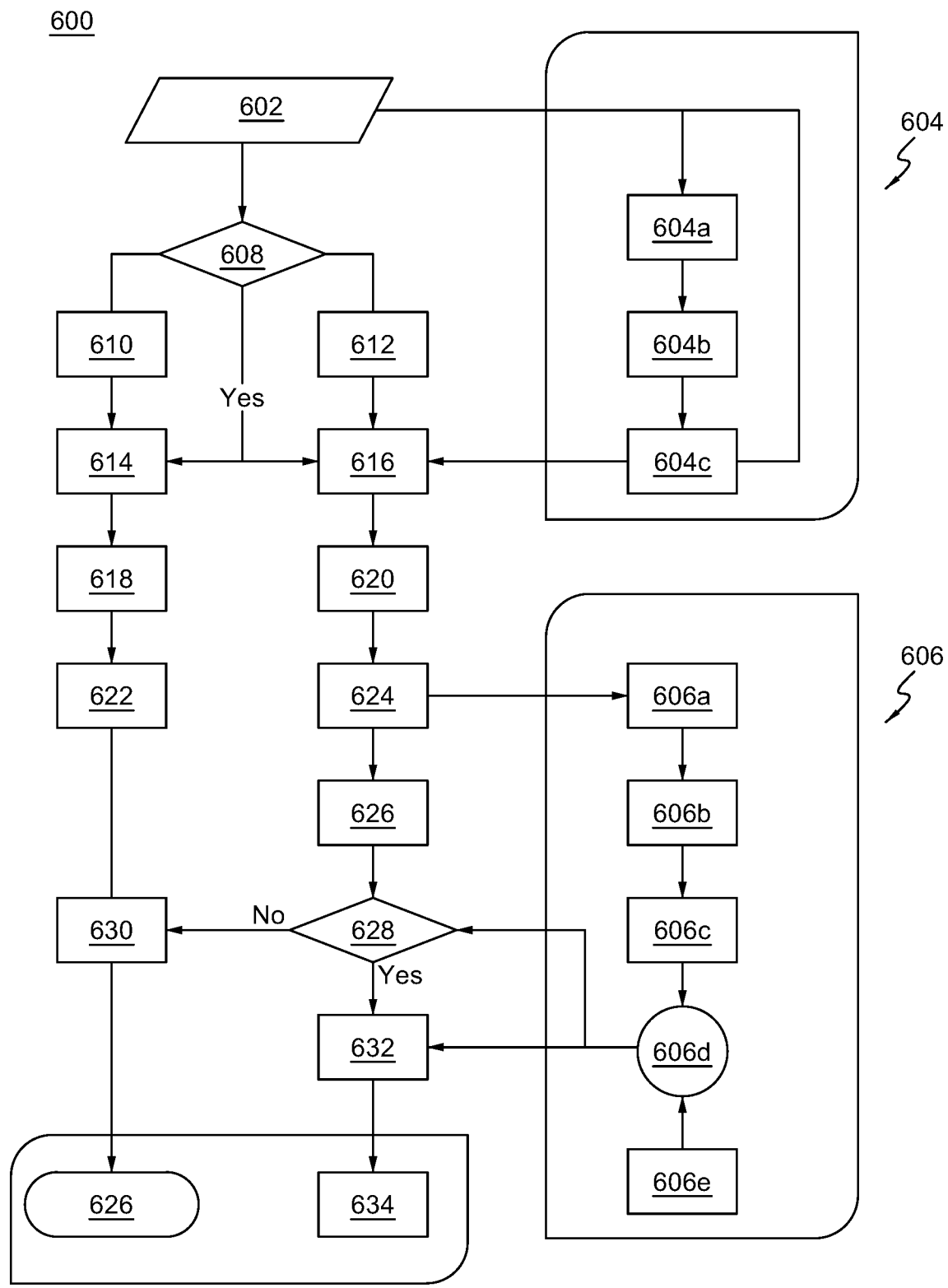
FIG. 7A is a first portion of a flow chart for a pre-processing phase.
Figure 7B:
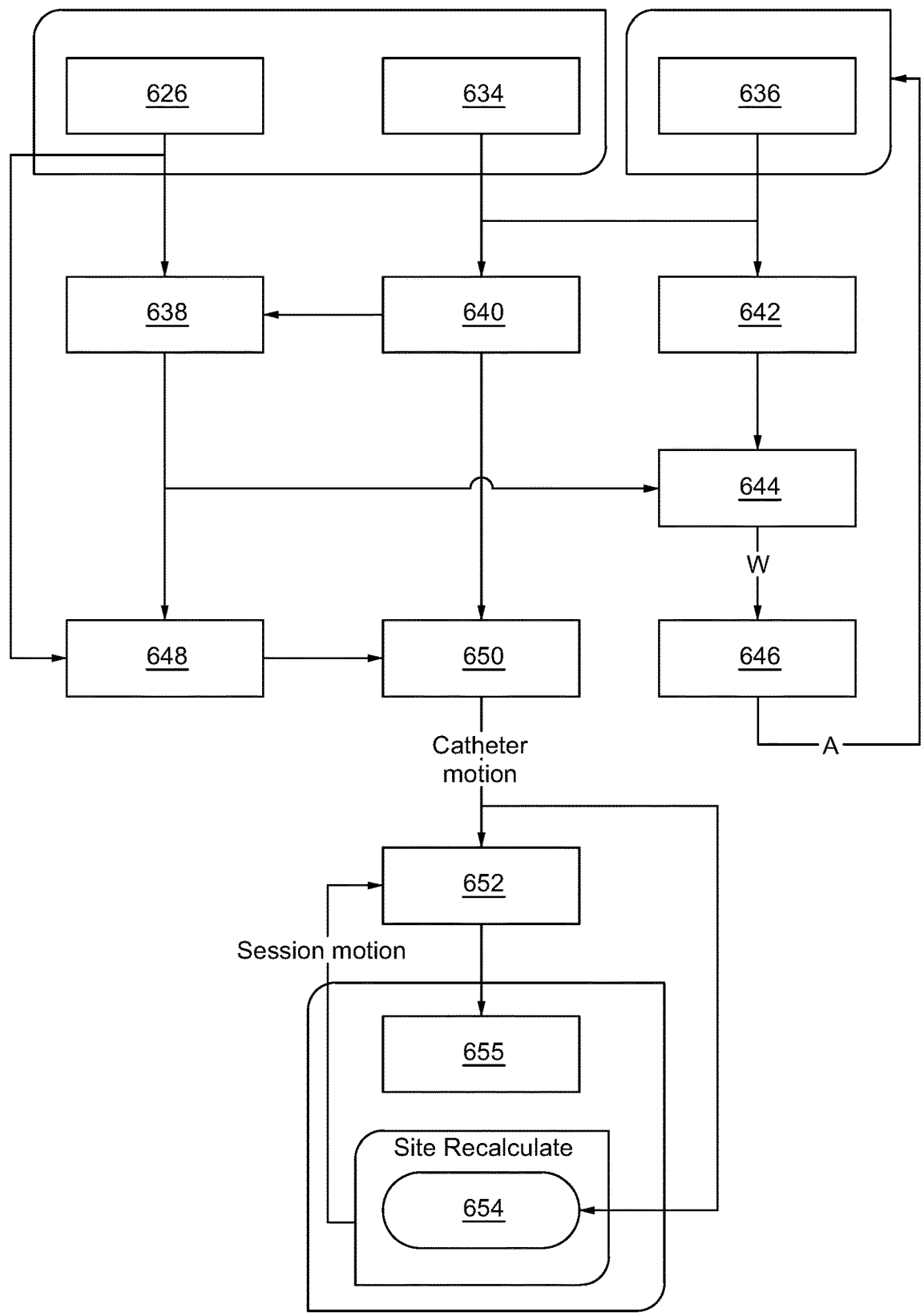
FIG. 7B is a second portion of the flow chart from FIG. 7A.

A more detailed overview of the pre-processing phase 310 is illustrated in FIGS. 7A and 7B. As shown in the process 600, a pre-processing phase starts with obtaining a data set, i.e. step 602. The data set can include the RI, locations, statuses and various other information.

As shown on the right side of FIG. 7A, an ablation correction phase 604 is provided. This phase is configured to correct the offset in the RI signals due to ablation interference. The ablation correction phase 604 includes setting a buffer at step 604a. Next, at step 604b, the offset is estimated per channel by comparing the RI signal edges (i.e. signal 5 and 95 percentiles) just before and just after the ablator is turned on. Then, at step 604c, this estimated offset is compensated (e.g., subtracted or added) from the RI signals. In one aspect, ablation offset is measured and corrected per ablation session, and is performed dynamically and continuously. With each ablation, the estimation becomes more accurate due to the offset measurements being averaged over time.

As shown in FIG. 7A, the buffer at step 604a can include a 1.5 second buffer of the RI signals to enable fast estimation. The buffer can include at least 151 samples of RI signals. The parameters for accounting for the effect of ablation on the RI signals can vary depending on specific circumstances, such as the number of RI channel signals, ablation strength and duration, characteristics of the patient, etc. Data from step 604c is ultimately sent to step 616, described in more detail below.

Continuing from step 602, a validation step 608 is carried out to determine if the data set is complete. In one aspect, the computing system 4 or a manager in a software module confirms the validity of the data. As used herein, the term manager can refer to any computational interface, such as an interface within CARTO VISITAG™ processing unit or central module 220. This component is configured to insert or input data and to also receive an output of data. In the event that the data is invalid, the manager sends a reset or soft-reset signal to the algorithm processor to empty all of the buffers and begin filling the buffers again with new data if errors are detected. The algorithm ensures that the buffers are full with valid data before progressing to a subsequent step.

If the data is determined to not be valid due to location data issues, then the buffer is reset at step 610, and location filter buffers are updated at step 614. In one embodiment, step 614 includes 151×3 samples.

If the data is determined to not be valid due to RI channel related issues, then the buffer is reset at step 612, and RI filter buffers are updated at step 616. In one embodiment, step 616 includes 151×5 samples.

If the data is determined to be valid, then the location filter buffers and the RI filter buffers are also updated, as described with respect to steps 614 and 616, but the buffers do not need to be reset.

Continuing on from steps 614 and 616, the location data and the RI signal data both undergo a filtering step. The location data from step 614 is filtered at step 618. In one embodiment, the filter at step 618 is a low-pass FIR filter. The RI signal data from step 616 is also processed. In one embodiment, the filter at step 612 is a low-pass and derivative FIR filter.

Step 622, which follows step 618, then updates location buffers. Step 624 follows step 620 and includes updating RI buffers. From step 622, the location data is further processed at step 626, which includes obtaining a last minute buffer, and obtaining filtered catheter motion.

Regarding the RI signal data, after step 624, this data is further processed using an Eigenvector estimation phase 606. In general, phase 606 includes transforming every sample in the 5D FRI vectors into their first Eigenvector using the Eigenvector coefficients in vector V. In one aspect, vector V is a five-element vector of weights that multiple the five RIs to obtain the most prominent respiration vector. The vector V is obtained via SVD decomposition and $RI=U*S*V'$ in one aspect.

Step 606a includes measuring breaks in the derivative RI (DRI) signal. Step 606b includes checking that there is no respiration gap and the data is valid. Step 606c includes calculating V using the SVD. The SVD is calculated only once the FRI buffer is full with valid numbers and no respiration gap was found. In one embodiment, this step can include calculating V in one second intervals. Once V is obtained at step 606d, then the data can be further processed at steps 628 and 630. Step 606e is a validity check, and if a soft-reset signal was received, then V is reset to zero.

Step 628 includes checking whether (V1)>0. If not, then step 630 includes waiting for the next round of data. If so, then step 632 defines the RV=[FRI×V, DRI×V]. Calculating V (or RI2RV as used in one aspect of the algorithm) includes the following steps. Once the RV buffers are full, a two second test can be performed to determine if there are any respiration gaps (i.e. due to apnea) inside the DRI buffer. If the buffers are full and there are no gaps, then a calculation is carried to out to determine three different V by three different SVDs: one on the first 30 seconds, one on the last 30 seconds, and one on the entire 60 seconds DRI buffer. If all the three Vs are correlated (i.e. within a predetermined value of each other), then the 60 second V is selected as the new V going forward. The process then verifies that the minima of the resulting respiration signal RV(1) is correlated to a maxima of the y-location of the probe. In one aspect, the minima of the respiration signal (RV1) is preferred to represent the end-expirium (as compared to the in-expirium). For this process, the corresponding Y-values of the catheter location are checked and the process ensures that the Y values in the respiration minima is larger than the Y values in the respiration maxima because the Y value is maximal in humans at end-expirium times. In this orientation, the Y-direction in is oriented in a heart-head direction in a patient as the patient lays on their back.

If the resulting respiration signal RV(1) is not correlated to the maxima of a y-location of the probe, then the selected V is reversed to be negative (i.e. −V). Finally, step 634 includes the last minute buffer that was used in step 626, to provide RV.

As shown at the top of FIG. 7B, filtered motion is provided from step 626 and the RV are provided from step 634. Step 636 includes providing a correlation matrix A, which accounts for weights buffering and respiration gaps. Generally, FIG. 7B shows the steps for motion decomposition according to one aspect. The motion decomposition is based on the assumption that the filtered catheter motion (FCM) can be modeled as a sum of two main components: (1) Respiration compensation vector (RCV)=Correlation matrix A×RV; and (2) Catheter-heart motion=Smooth (FCM−RCV)=Spline(FCM−RCV).

The term "smooth(x)" as used herein generally refers to a mathematical smoothing function, which can be implemented according to any computer interface, electronics, or programming tool, such as MATLAB®. Various other functions, such as "smooth," "exp," "pinv," "spline," "rms," "norm," etc., used herein may be implemented using any known computer interface, electronics, or programming tool, such as MATLAB®. These computer interfaces, electronics, or programming tools are generally configured to provide matrix, array, and data manipulation, plotting functions, data implementation, and/or algorithm implementation.

The term "smooth" as used with respect to functions or equations herein refers to a method of noise reduction or a data set in one aspect. In one aspect, the smoothing function uses a moving average, a filter, or uses a smoothing spline.

In one aspect, the term "spline(x)" as used with respect to functions or equations herein refers to a function that calculates, returns, or generates a vector having interpolated values that correspond to points of an array, matrix, or dataset x. In one aspect, a cubic spline interpolation can be used.

In one aspect, the term "exp(x)" as used with respect to functions or equations herein refers to an exponential function $e^x$ and determines each element in an array, matrix, or dataset x.

In one aspect, the term "pinv(x)" as used with respect to functions or equations herein refers to a function that calculates, returns, or generates a Moore-Penrose Pseudo-inverse of an array, dataset, or matrix x.

In one aspect, the term "norm(x)" as used with respect to functions or equations herein refers to a function that determines a scalar or magnitude value, and calculates, returns, or generates a measure of magnitude of elements in an array, matrix, or dataset x.

In one aspect, the term "max(x)" as used with respect to functions or equations herein refers to a function that calculates, returns, or generates the maximum elements of an array, matrix, or dataset x.

In one aspect, the term "rms(x)" as used with respect to functions or equations herein refers to a function that calculates, returns, or generates the root-mean-square of an array, matrix, or dataset x.

Any one or more of the function terms used herein can be implemented using any computational element or software program configured to perform computational analysis and functions. One such example of a program is MATLAB®. One skilled in the art would understand these mathematical or programming functions, and equivalents or variants thereof, can be implemented to carry out specific functions, calculations, or manipulations of the data, matrices, arrays, and information described herein. Any of the functions described herein can be implemented on the computing system 4, or any other electrical or computer hardware and software.

Decomposition is calculated every 100 ms in one embodiment. These 100 ms segments can be calculated on the entire last minute of data in order to allow for slow adaption of the correlation matrix A over the last minute.

In one aspect, two versions of the catheter-heart motion are used by controlling the curvature of the spline. In one version, intermediate catheter motion is calculated with a single curvature or smoothing parameter. Step 638 includes estimating the intermediate catheter motion with the following calculation: Smooth(FCM−RCV). This smoothing parameter limits the speed of the spline direction change and this is equivalent to assume slow accelerations. The intermediate catheter motion is used in the estimation of the correlation matrix A. Specifically, the correlation matrix A is tuned using segments with slow intermediate catheter motion speed (i.e. slow segments). On these slow segments, the catheter acceleration is small with respect to the respiration motion, and the correlation matrix (A) is estimated more accurately. During step 638, the intermediate catheter motion is estimated using a smoothing function to limit the resulting curvature.

In one aspect, intermediate catheter motion (ICM) =Smooth(T0,(FCM−RCV),SmoothP). In this equation, T0 is a vector of reference time (0 to 60 seconds in 0.1 second increments). The inaccuracy is estimated by the norm function of the estimation error. Using step 638, the ICM has an error component (ICMerr) and ICMerr=Norm(FCM−RCV−ICM), and SmoothV=Exp(−2*ICMerr), and SmoothP=0.005. This process corrects or updates the ICM to allow larger curvature where the ICMerr is unacceptably large. If ICM were equal to FCM−RCV, then the ICMerr would be zero.

SmoothP is a smoothing parameter that limits the spline curves second derivative (i.e. acceleration), and is generally defined as a smoothing parameter to control the curvature through a segment. SmoothV is generally defined as smoothing vector to control curvature per data point. During this step, it is assumed that slow accelerations help converge the correlation matrix A. The slow accelerations, i.e. the intermediate catheter motion (ICM), are used in combination with faster accelerations, i.e. the catheter motion (CM), in order to provide a more robust and accurate reconstruction. The ICMerr or error of the ICM is an estimation error and this is equal to Norm(FCM−RCV−ICM). The ICMerr is used to estimate the accuracy of the reconstruction of the FCM. Based on this, the spline is corrected when the error of slow motion is high. In one aspect, the smoothing function smooths data using a moving average filter.

In another aspect, shown in step 648, catheter motion (CM) is the corrected ICM using the correction vector (SmoothV) and allows fast acceleration where the intermediate catheter motion is determined to be inaccurate. This correction vector (SmoothV) allows different curvatures (i.e. accelerations) at different spots along the last minute of data. The CM equals: Smooth(T0, (FCM−RCV), SmoothP, smoothV). This process is a way to force the smooth function to be more flexible, which allows for larger curvature in points where the reconstructed error is larger.

Step 650 includes estimating the catheter motion based on the following equation: Smooth(FCM−RCV,SmoothV). In one aspect, a function or process is carried out to smooth the catheter motion with a spline model by limiting the spline curvature (i.e. the second derivative of the curvature).

When estimating the CM, fast segments are permitted to have increased curvature to provide for more accurate and better reconstruction. The smoothing spline function f is shown in the following equation $$\text{smooth}P \cdot \Sigma_{j=1}^{n} |xyz_j - f_j|^2 + (1 - \text{smooth}P) \cdot \int \text{smooth}V(t) |D^2f(t)|^2 dt \quad \text{(Equation 3)}$$

In this equation, |z|2 represents the sum of the squares of all the entries of z, n is the number of entries of x, and the integral is over the smallest interval containing all the entries of x. The default value for the weight vector W in the error measure is ones(size(x)). The default value for the piecewise constant weight function smoothV in the roughness measure is the constant function 1.

In Equation 3, $D^2f$ denotes the second derivative of the function f. The parameter smoothP controls the smoothing strength. When smoothP=1, the spline goes through all the original data points without any curvature limitations. When smoothP=0 the spline cannot include any curvature so the result is a straight line. In this situation, smoothing can be used to control the catheter allowed acceleration.

For intermediate catheter motion (ICM) only the non-zero smoothP parameter is used, and the sharp movements are smoothed or filtered out. To model fast or sharp movements, the smoothV vectors having a value less than 1 are used.

SmoothV values less than 1 put extra weight or emphasis on certain aspects and therefore can include higher curvature in those places.

The whole concept of smoothing in this aspect is balancing between two contradictory elements. The first element generally tries to remain true or accurate to an input vector even when there is noise (i.e. many inconsistent direction changes). The second element is to be as smooth as possible with minimal direction and speed changes. SmoothV is a vector of values that directs the smooth function to prefer the first element over the other, or vice versa, in different parts of the input vector. So as SmoothV values are closer to 0, the smoothing function should be more accurate and less smooth. In one aspect, smoothV allows smoothP in Equation 3 to be localized.

From step 650, catheter motion is used for site segment detection at step 652. At step 654, catheter motion and site segment detection data are sent to a central module 655 that is configured to store data regarding the site segment and catheter motion. An iterative process is then carried out that analyzes session motion, and recalculates the ablation site. The ablation is divided into sites and is recalculated in every step, and can vary significantly according to compensated catheter-heart motion. This catheter compensated location can be saved in a central module or storage unit for site recalculation after a user or surgeon has adjusted various control parameters.

Step 640 includes calculating the RCV in the last minute of information and data. In one embodiment, the RCV=A× RV. In one aspect, correlation matrix A is also identified as RV2RCV. Estimating the correlation matrix A is generally performed using weighted mean squares and matrix inversion according to one embodiment. The weights (W) used in these calculations reflect how each data point in the last minute is configured to estimate the correlation matrix A according to at least one of the following criteria: (i) weight decay with time, (ii) preference for slow intermediate catheter motion speeds, (iii) RV validity, and (iv) duration of time from ablation.

Regarding factor (i), older samples generally receive lower weights than recent samples. Regarding factor (ii), slower speeds on long segments receive higher weights. Regarding factor (iii), during apnea, the RV is reduced to very close to zero, and cannot be used in estimating the correlation matrix A. Accordingly, apnea segments receive zero weights. Apnea detection occurs at step 642. Apnea is also generically known as depth of breathing, or the shallowness of breathing. Factor (iv) results in recent ablation segments receiving higher weights. The weight vectors are identified as the stability weights, and the step of estimating the stability weights is generally shown as step 644 in FIG. 7B. In other words, the intermediate catheter motion from step 638 is used to estimate the stability weights in step 644.

The apnea detection associated with factor (iii) and step 642 is defined in more detail. Respiration apneas are segments of time in which the respiration signal, i.e. the RV, is reduced due to apnea or other forms of shallow respiration. Due to their influence, the correlation matrix A should generally not be estimated during these segments. By using weight associated with each sample (which includes RV and location data), the effects of apnea or shallow respiration are minimized. Weights during shallow respiration (i.e. small RV signals) are zeroed, which eliminates the impact of these measurements on the overall estimation and correlation matrix A.

Figure 8:
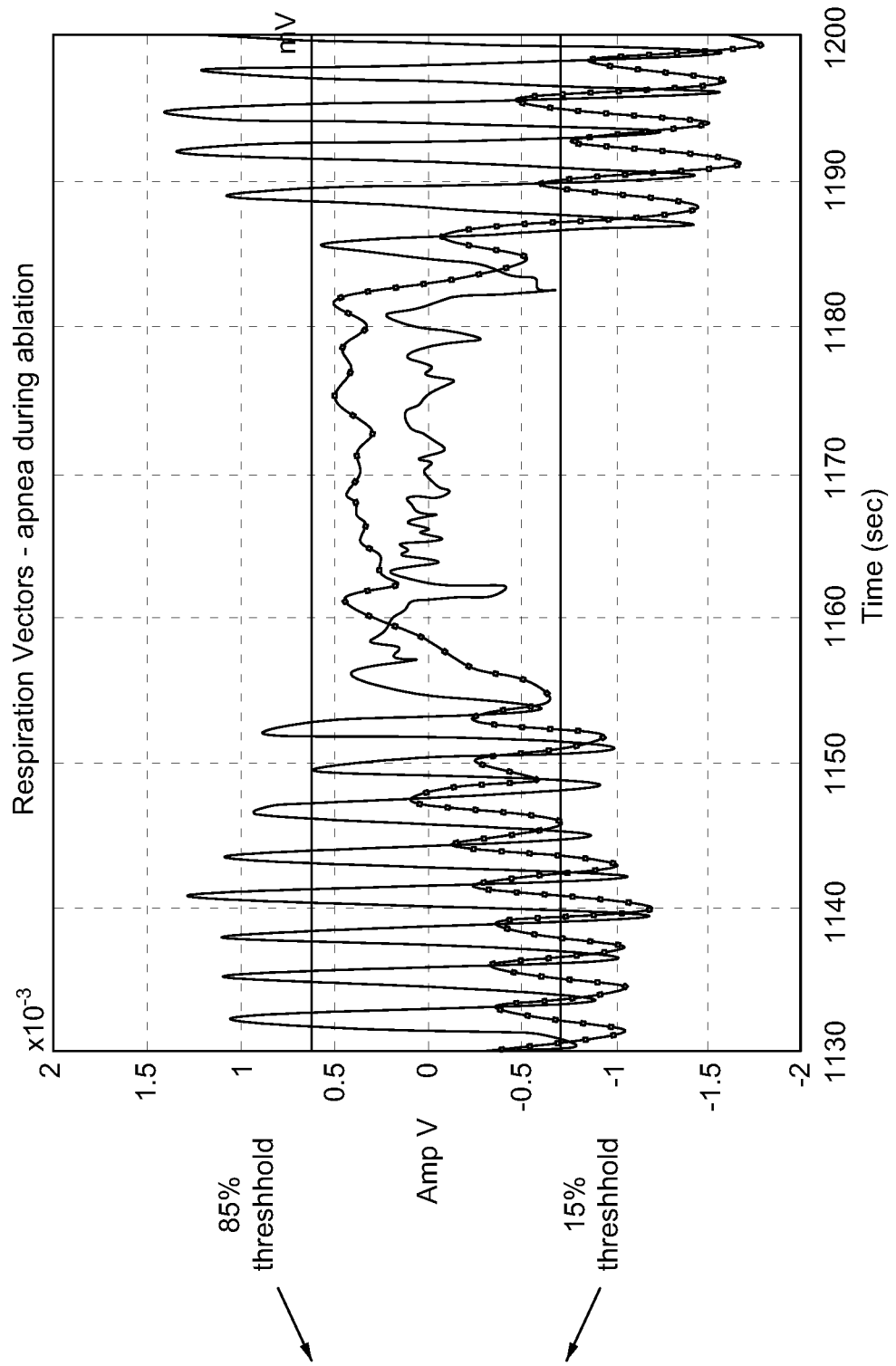
FIG. 8 is a graph illustrating respiration vectors during ablation.

FIG. 8 illustrates the effect of apnea on the RV during ablation. A gap in respiration is generally defined as time segments in which the respiration derivative cannot reach a predetermined extreme value and can only reach below 85% of the predetermined extreme value. As used in this context, these small and large parameters are defined by analyzing the 15-85 percentiles, and ignoring signals above and below these percentiles. Consecutive samples that are within the 15-85 percentiles are counted and analyzed. If the signal in a continuous segment happens to occur inside these thresholds and not crossing them, then the segment of all the samples in this continuous segment is indicated as a respiration gap, i.e. a shallow breath, and therefore can be discarded. The percentile values are selected over the last minute of data and define thresholds for the respiration derivative amplitude. When the respiration derivative signal is between the thresholds for a predetermined period, such as 5 seconds (which corresponds roughly to one respiration cycle), then the respiration signal is considered too weak and therefore should be discarded. The percentile values can be modified and generally selected to identify shallow respiration. One skilled in the art would understand that other filtering or analysis can be used to identify shallow respiration.

Further details regarding estimating stability weights are provided herein. Generally, the decomposition process into respiratory related motion and catheter related motion is performed more accurately when the catheter is relatively stable or is slowly sliding against another surface, i.e. tissue. Identifying relatively stable segments is important for producing a reliable output. Stable segments are generally defined herein as segments of time in which the intermediate catheter motion speed is relatively slow (i.e., <2.5 mm/sec) for a specific period of time (i.e., >3-5 seconds). Estimating the correlation matrix A is carried out using the stable segments or essentially stable segments. Stable segments are emphasized due to the assignment of higher weights for samples during stable times. Stability weights are converted into a vector of numbers that correspond to the last minute and represents the point relevancy for the correlation matrix A estimation (i.e. the RV2RCV matrix). Besides speed stability, factors regarding recency (i.e. the age or how old a segment is) and data segments collected during ablation are also considered. Recent samples receive higher weights than older samples, and ablation segments receive higher weights than non-ablation segments.

Figure 9:
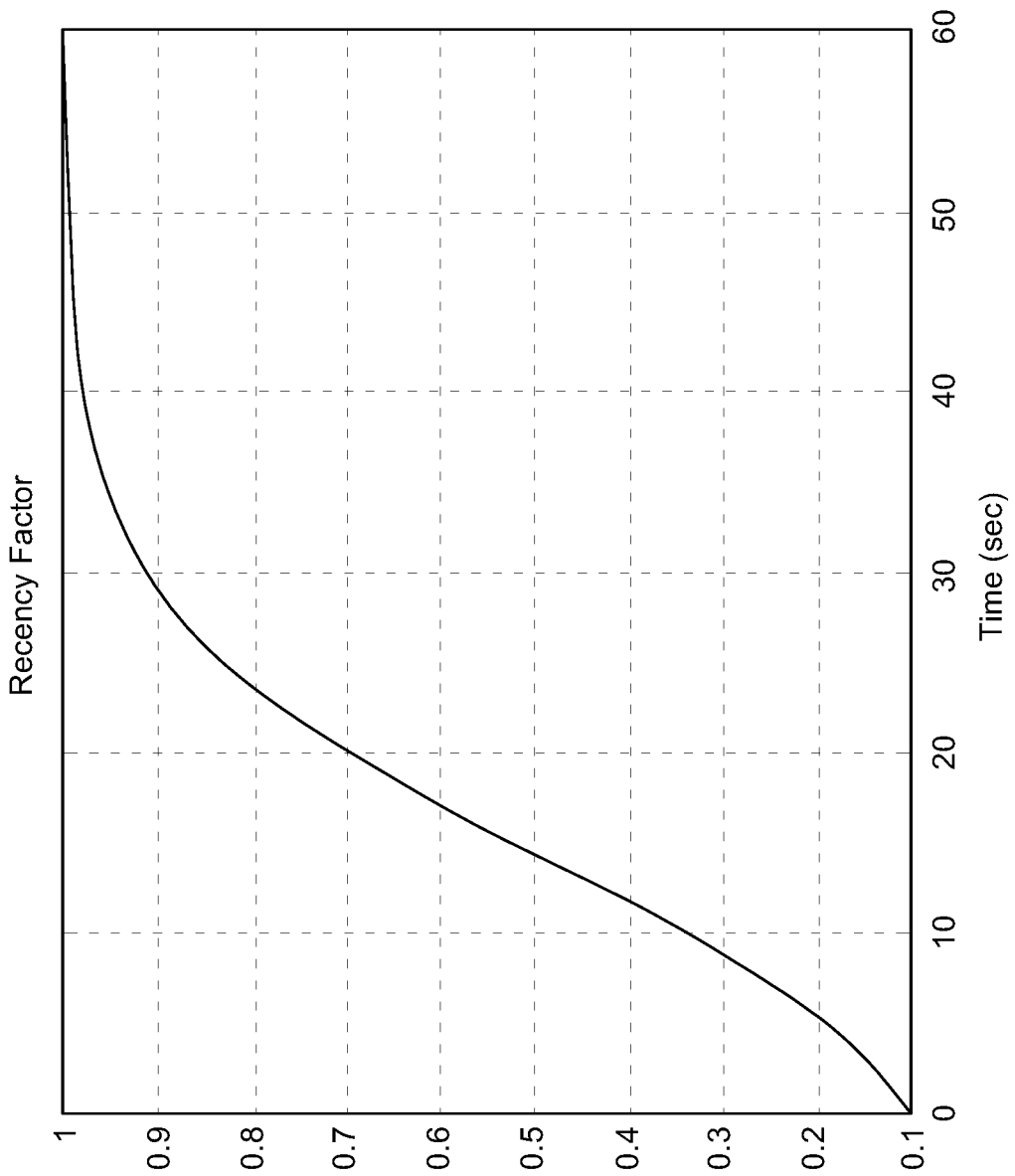
FIG. 9 is a graph illustrating a recency factor.

FIG. 9 illustrates one aspect of the recency factor with respect to stability weights. As shown in FIG. 9, higher weights are assigned to more recent samples (i.e. the right-hand side of the graph) and the older samples receive a lower weight. As shown in FIG. 9, a sigmoid provides a smooth transition between recent and older signals.

Figure 10:
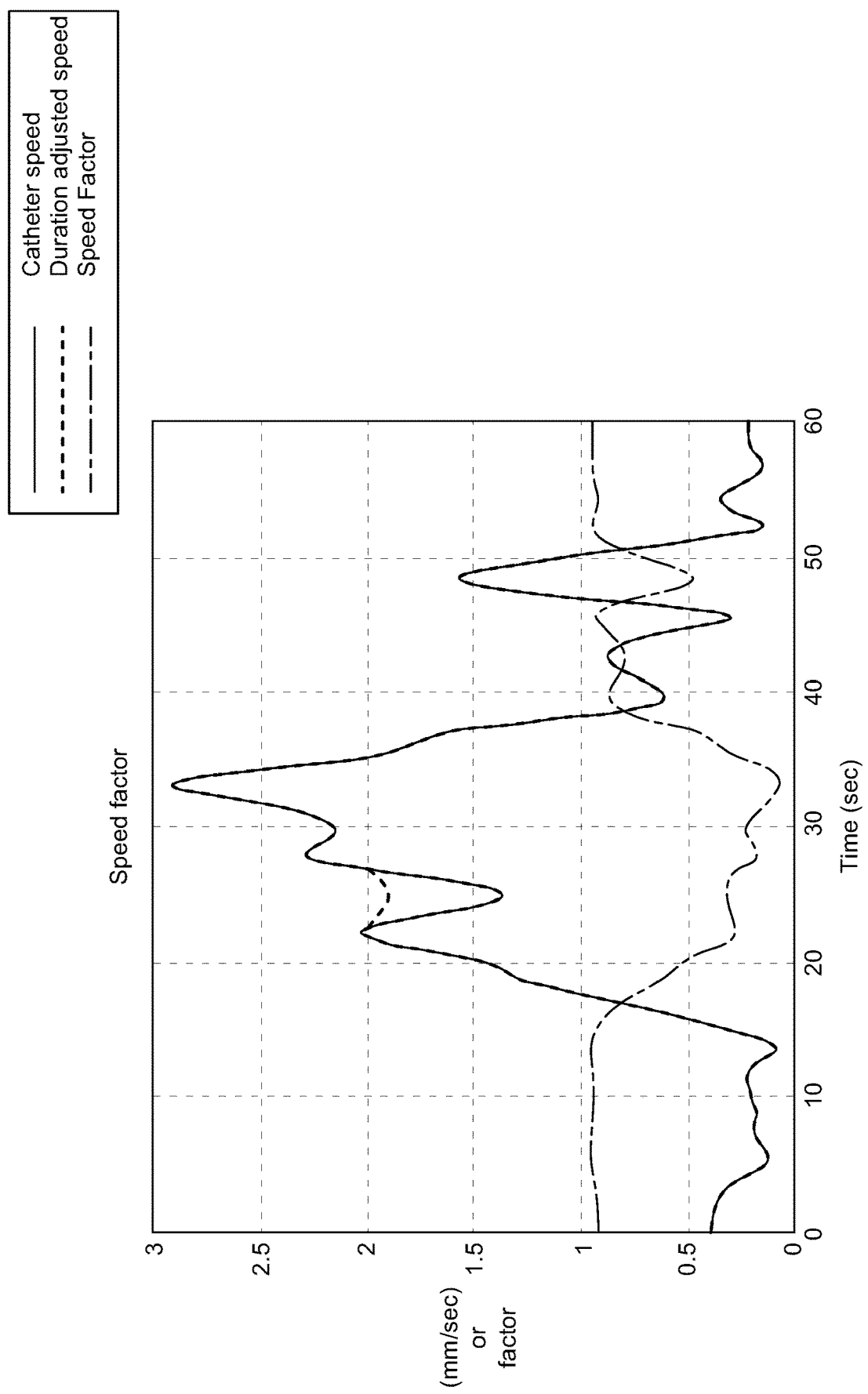
FIG. 10 is a graph illustrating a speed factor.

FIG. 10 illustrates one aspect of the speed factor with respect to stability weights. As shown in FIG. 10, higher weights are used when the catheter estimated speed is low, and lower weights are used when the catheter estimated speed is high. In one aspect, the weights are decreased when the low speed duration is shorter than an average respiration cycle. As shown in FIG. 10, the duration is adjusted by artificially increasing the estimated speed.

Figure 11:
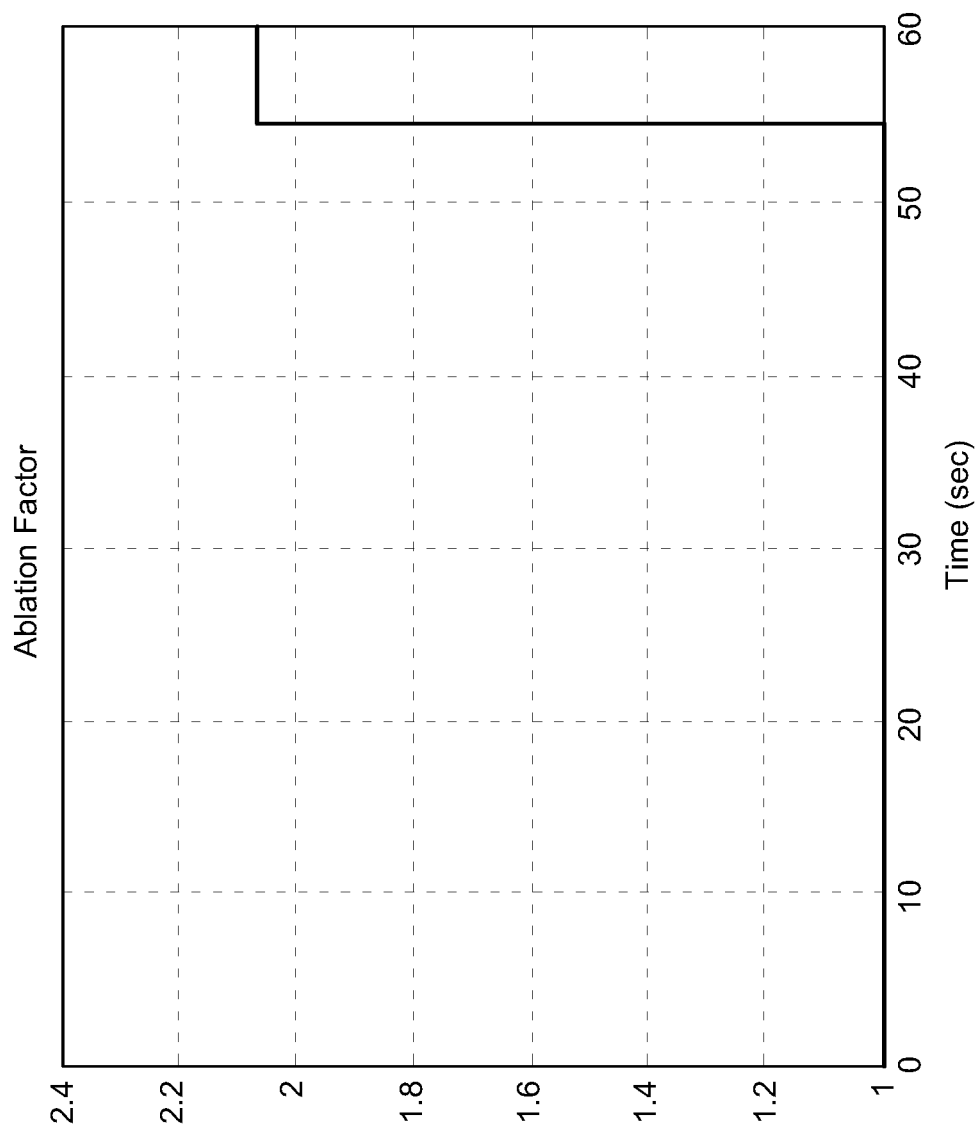
FIG. 11 is a graph illustrating an ablation factor.
Figure 12:
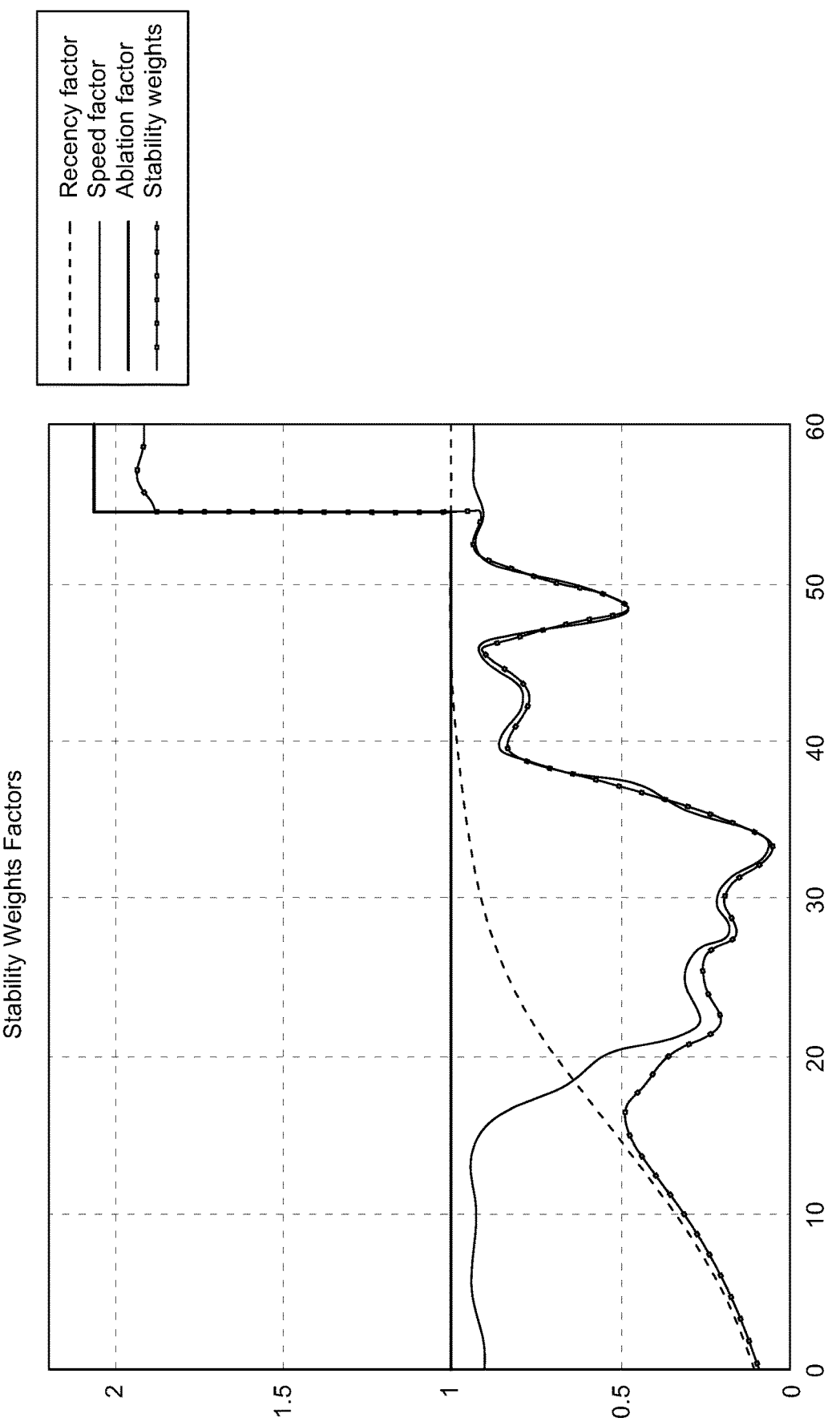
FIG. 12 is a graph illustrating multiple stability factors.

FIG. 11 illustrates one aspect of the ablation factor with respect to stability weights. In general, higher weights are assigned to signals when ablation is occurring, as shown in FIG. 12.

In one aspect, the three factors described above with respect to FIGS. 9, 10, and 11 are used to generate the total stability weights. In other words, the total stability weights vector can be a sample by sample product of all three factors. One skilled in the art would understand that more than three factors can be used. FIG. 12 illustrates how the stability weight factors can be measured over time. In one aspect, the recency factor is only calculated at the initialization because this factor is fixed.

Returning to FIG. 7B, using the weights (W), the correlation matrix A is estimated at step 646 using the following equation: $A(2\times3)=Pinv(RV)\times W(FCM-RCV)$. As used in this aspect, $A(2\times3)$ transforms the RV (two columns matrix representing the respiration signal and its derivative) into the RCV (three column matrix representing the X-Y-Z of the respiration matrix). Matrix A is the transformation matrix between the respiration vectors (RV) and a 3D respiration ellipse. This equation represents a regression using mean square since $FCM=A*RV+CM+err$, which represents a decomposition equation. Because FCM cannot be decomposed perfectly into these models, there will be some error (err) which represents the difference between the FCM or actual motion and the sum of the two models. Essentially, these processes tune the transformation matrix A to minimize the error. In order to minimize the error, the correlation matrix A is regressed such that $A=((FCM-(CM))/RV$ which equals $Pinv(RV)*(FCM-(CM))$. With the weights W added to give greater weight to time segments with a slow (CM), the equation then becomes $A=Pinv(W*RV)*W*(FCM-(CM))$, in one aspect.

As shown in FIG. 7B, the correlation matrix A at step 646 is then sent back to step 636 in order to provide a circuitous or continuous cycle for continuously estimating and updating the correlation matrix A. The process in FIG. 7B is iterative, such that the correlation matrix A is constantly updating and becoming more accurate through each iteration. The correlation matrix A is generally updated based on the calculated intermediate catheter motion, and any one or more of the following steps: estimating apnea segments based on the RV; estimating stability weights based on the intermediate catheter motion; and regressing the correlation matrix A based on $A=(FCM-ICM)/RV$.

In one aspect, it is assumed that the 3D RCV can be modeled as a product of the 2D RV (which equals the main respiration signal+a phase shift) and the correlation matrix A (2×3). The parameters of the correlation matrix A are estimated based on the RV, a rough estimation of the respiration vector (which equals the filtered catheter motion minus the intermediate catheter motion), and the stability weights vector by minimizing the mean square error. By providing inputs of the (i) FCM, (ii) intermediate catheter motion, and (iii) stability weights, the correlation matrix A is generated as an output.

The intermediate catheter motion assumes relatively slow accelerations of the catheter, and cannot represent the true catheter motion in segments of high speed. An intermediate catheter motion error factor can be estimated based on segments of faster motion. Catheter motion is recalculated while increasing the curvature for high speed segments to allow for fast motion as well. Using this approach, the ICM error $(ICMerr)=Norm(FCM-ICM-RCV)$. In other words, the respiration data equals total catheter motion minus intermediate catheter motion, and total catheter motion minus respiration equals in-heart catheter motion. In one embodiment, ICMerr is the per sample Euclidian distance in R3 between the measured location FCM and the slow model reconstructed location ICM+RCV. SmoothV is used to correct the intermediate catheter motion to find the in-heart catheter motion, in one aspect.

Station finding, also known as location finding or site finding, generally includes identifying periods when the catheter or probe is stable. This process includes performing logic and functions that produce stations' time edges and center locations based on the compensated motion. The stations in the last session are continuously updated along with the correlation matrix A and the resulting compensated motion. Stability is generally defined as a continuous segment of time in which the estimated catheter speed is below a user predefined threshold.

The catheter speed is calculated by taking a derivative of the catheter position over the last minute. The last minute locations are updated at least every 0.1 second, and are saved for the whole minute. These values can vary depending on the specific requirements of a particular application. The last catheter speed value from this buffer is saved and accumulated in the last speed buffer.

For example, in one embodiment, the end-5 value in the catheter speed buffer is the speed of the catheter using the end-5 and end-7 values in the catheter one minute locations buffer that were updated in current iteration. Here, the end-5 value in the last speed buffer is the last catheter speed that was calculated 5 iterations ago.

A minimum value of the catheter speed and the last speed over the last minute is defined as the minimal speed, and is used to detect when the catheter is stable. A minimal speed buffer includes all the minimum speeds that were estimated during the last minute. Segments of continuous speed that are smaller than a threshold speed are identified in this buffer, while trying to find a time period when the catheter was stable.

An estimation close to the current time is not accurate enough because speed can change dramatically near the buffer end without a reliable indication on the estimated speed. Accordingly, any determination regarding stability can be delayed for at least one second, and this predetermined delay can vary.

Boundaries of a current stable segment can be updated and then terminated if necessary. If a current stable segment was not found or if it was previously terminated, then a search for new stability segment in the recent several seconds of the estimated catheter motion is carried out.

If a stability segment was already found, then the boundaries are updated according to an updated minimal speed buffer. The starting point of the current stable segment can also be updated by looking backwards from the last index of stable segments until the earliest point when the speed is lower than a threshold.

The ending point of the stability segment can be updated by looking forward from the last index of a stable end until the latest point that the catheter speed is lower than a threshold.

A stable segment is not terminated until a predetermined period (i.e. roughly one second) occurs from the current time in order to avoid terminating segments due to edge inaccuracy. If a stable segment was not yet found, then the search for stability from the current time backward is carried out to find the earliest moment when a predetermined threshold was crossed.

In addition to the above process for determining when a segment is stable, the present disclosure also is directed to defining a localized segment as a time segment in which all its points (i.e. distance from its own center of gravity) are below a threshold. In other words, when considering a curved line in 3D space, the XYZ mean of the curved line can be calculated and this is the center of gravity. From this value, it is possible to calculate the distance from center (DFC) for every point on the line.

This process involves locating a site (i.e. a time segment) when the ablator is on and the catheter is both stable and localized. One aspect of this process is described in more detail herein. In one aspect, a stable time segment during ablation is identified.

The processes and algorithm disclosed herein can divide, segment, or otherwise split the stability segment during ablation into localized segments (i.e. sites) for which the maximal DFC is below a predetermined threshold. In one aspect, the predetermined threshold is 3.0 mm. One skilled in the art would understand that this value can vary. The algorithm for splitting the stability segment into sites essentially obtains the minimal number of sub-segments that maintain a localization criterion. In one aspect, it is a recursive function that ceases or stops in the event that the current sub-segment is localized. In one embodiment, this involves determining whether the maximum DFC is less than a threshold, i.e. 3.0 mm in one aspect.

In one aspect, an algorithm is provided that essentially splits or segments a curve in 3D dimensional space (i.e. the in-heart motion 50, catheter-heart motion, probe-cavity motion, etc.) into localized curves. As used herein, the term curve is defined as a vector of XYZ coordinates in 3D space that represents the course of motion of an object. In one aspect, this process involves determining the center of gravity of a curve defined by a data set, in which the center of gravity is defined as a point in 3D space that represents the mean value of each coordinate of the curve. The DFC is defined as a one-dimensional vector that represents the Euclidean distance between each point in the curve relative to the center of gravity, in one aspect. Finally, a localized curve is defined as a curve for which a maximum DFC is smaller than a predetermined threshold distance. In one aspect, this distance is 3.0 mm.

In one aspect, defining a split curve of 3D dimensional data is a recursive function. First, the process includes finding a central localized curve based on the obtained data (i.e. in-heart motion 50, catheter-heart motion, probe-cavity motion, etc.). This step can include determining whether a test curve (i.e. input curve) defined by the data set is localized, i.e. whether a maximum DFC is smaller than a threshold. During this step, an index of a minimal DFC for a predetermined curve can be identified and an index for a maximum DFC for a predetermined curve can be identified. If the index of the maximum is less than the index of the minimum (i.e. if the maximal DFC is before the minimal DFC), then a first point of the test curve data can be excluded, i.e. data points are set aside. If the index of the maximum is not less than the index of the minimum, then a last point of the predetermined curve data can be excluded, i.e. set aside. Finally, the process recognizes or registers a central localized curve as the test curve. The test curve, which is basically a potential candidate for the central localized curve, is iteratively cut from either side until it is localized and therefore declared or identified as the central localized curve. In certain situations, an input curve or the initial test curve will be the localized immediately, and therefore the cutting step can be omitted. In these situations, the input curve is the central localized curve, and therefore the splitting algorithm is not required.

The process then checks whether any curves exist before the central localized curve. In one aspect, this step is performed based on the excluded or set aside pre-central points (disclosed above with respect to an index comparison step) by using a splitting function in a recursive manner. The process generates a list of pre-central localized curves for analysis based on the preceding step. The process also checks whether any curves exist after the central localized curve. In one aspect, this step is performed based on the excluded or set aside post-central points by using a splitting function in a recursive manner. The process generates a list of post-central localized curves for analysis based on the preceding step. The list of all localized curves includes preceding localized curves, central localized curves, and proceeding localized curves. In other words, the algorithm essentially segments or breaks a 3D curve into a number of localized curves for further analysis. In particular, the analysis determines whether curves have a maximal DFC that is less than a predetermined distance threshold.

Figure 13:
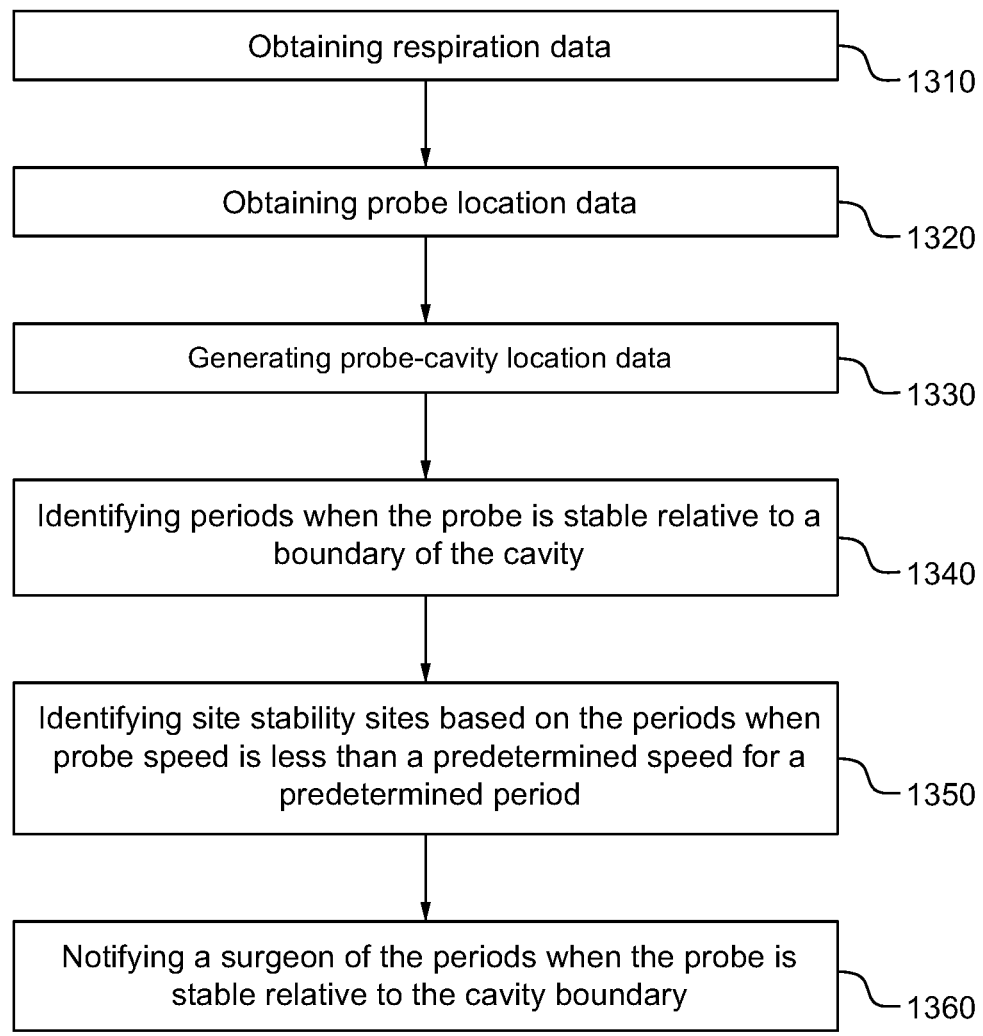
FIG. 13 illustrates a flow diagram of a method according to one embodiment.

FIG. 13 illustrates a flow diagram illustrates various steps for a method 1300. As shown in FIG. 13, step 1310 includes obtaining respiration data. This data can be obtained by sensors attached to a patient's body. In one aspect, this data is obtained by a series of patches or sensors (i.e. sensors 5 from FIG. 1) attached to a patient's body that are configured to detect impedance values based on the patient's lungs filling with air. In another aspect, this data is obtained via a sensor arrangement including a catheter integrated with a sensor as well as external sensors, or solely based on a sensor integrated with a sensor. Breathing is generally based on a patient's diaphragm moving up and down, which also displaces the patient's heart. Accordingly, obtaining the respiration data is important for mapping the motion of a catheter within a patient's heart during respiration.

Step 1320 includes obtaining probe location data, which can be generated via any known tracking method or system. The probe location data can also be obtained using sensors (i.e. sensors 5 from FIG. 1) attached to a patient's body. In one aspect, the sensors are configured to generate a magnetic field and motion of the catheter inside of patient can generate magnetic signals to indicate a position of the catheter.

Step 1330 includes generating probe-cavity location data by compensating (e.g., subtracting or adding) the respiration data from the probe location data. Step 1340 includes identifying periods when the probe is stable relative to a boundary of the cavity. Step 1350 includes identifying site stability sites based on the periods when probe speed is less than a predetermined speed for a predetermined period. In one aspect, the predetermined speed can be 2 mm/second and the predetermined period can be at least three seconds. In one embodiment, the method 1300 includes applying a filter to the respiration data and the probe location data.

Step 1360 includes notifying a surgeon of the periods when the probe is stable relative to the cavity boundary. This step can include providing notifications via visual alerts or indicia (which can be displayed via monitor 3), audio alerts or indicia (which can be played via computing system 4), or any other notification such that the surgeon is informed of the stable periods. In one aspect, markers, tags, or visual indicators are overlaid or inserted onto a three-dimensional mapping or image of the location data and are displayed on a monitor (e.g., monitor 3 in FIG. 1).

Step 1310 can further include converting respiration indicators by using singular value decomposition (SVD) to obtain a first Eigenvector and a first Eigenvector derivative. The first Eigenvector can correspond to a primary respiration signal and the first Eigenvector derivative can correspond to a phase shifted respiration signal. The method 1300 can include transferring the primary respiration signal and the phase shifted respiration signal from two dimensions into a three-dimensional ellipsoid based on a correlation matrix. The method 1300 can also include determining the correlation matrix by calculating a root mean square deviation between the probe location data and the probe-cavity motion data. The method 1300 can include determining the correlation matrix based on weighted factors including at least one of: (i) age of the respiration data; (ii) speed of the probe; (iii) depth of respiration; or (iv) data obtained during ablation. In one embodiment, the method 1300 includes generating an image including estimated respiratory motion based on the respiration data, probe motion based on the probe location data, and probe-cavity motion based on the probe-cavity location data. This image can then be displayed on a monitor to a surgeon, along with indicators, tags, or visual indicators showing periods when the probe is stable relative to the cavity boundary.

The disclosed subject matter is not limited to being used in connection with a heart. The disclosed subject matter can be used in a variety of applications to analyze features of any type of object, such as a chamber.

Any of the functions and methods described herein can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

Any of the functions and methods described herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It should be understood that many variations are possible based on the disclosure herein. Although features and elements are described above in particular combinations, each feature or element can be used alone without the other features and elements or in various combinations with or without other features and elements.

What is claimed is:

1. A method comprising:
   (i) obtaining respiration data of a patient via at least one sensor;
   (ii) obtaining probe location data for a probe positioned within a cavity;
   (iii) generating probe-cavity location data by compensating the respiration data from the probe location data;
   (iv) identifying periods when the probe is stable relative to a cavity boundary based on the probe-cavity location data;
   (v) notifying a surgeon of the periods when the probe is stable relative to the cavity boundary;
   (vi) ablating the cavity boundary during the notification to the surgeon of the periods when the probe is stable relative to the cavity boundary; and
   (vii) identifying stability sites based on periods when probe speed is less than 2.5 mm/second for at least three seconds.

2. The method according to claim 1, further comprising applying a filter to the respiration data and the probe location data.

3. The method according to claim 1, step (i) further including: obtaining respiration indicators via the at least one sensor.

4. The method according to claim 3, step (i) further including: converting the respiration indicators by using singular value decomposition (SVD) to obtain a first Eigenvector and a first Eigenvector derivative, the first Eigenvector corresponding to a primary respiration signal and the first Eigenvector derivative corresponding to a phase shifted respiration signal, the method further comprising reporting an indicia based on the primary respiration signal and the phase shifted respiration signal to the surgeon.

5. The method according to claim 4, the primary respiration signal and the phase shifted respiration signal being transferred from two dimensions into a three-dimensional ellipsoid based on a correlation matrix.

6. The method according to claim 5, further comprising:
   (i) obtaining probe-cavity motion data based on movement of the probe relative to the cavity; and
   (ii) determining the correlation matrix based on the probe location data and the probe-cavity motion data.

7. The method according to claim 5, the correlation matrix being determined based on weighted factors including at least one of: (i) age of the respiration data; (ii) the probe speed; (iii) depth of respiration; or (iv) data obtained during the ablation.

8. The method according to claim 1, further comprising generating an image including:
   estimated respiratory motion based on the respiration data,
   probe motion based on the probe location data, and
   probe-cavity motion based on the probe-cavity location data.

9. The method according to claim 1, step (v) including notifying the surgeon of the periods when the probe is stable relative to the cavity boundary via visual indicators displayed on a monitor.

10. A system comprising:
   (a) a probe configured to be inserted into an intra-body cavity of a patient;
   (b) at least one sensor configured to generate respiration data, the probe and the at least one sensor being configured to generate probe location data; and
   (c) a processor configured to:
      (i) generate probe-cavity location data based on the probe location data and the respiration data,
      (ii) identify periods when the probe is stable relative to a cavity boundary based on the probe-cavity location data,
      (iii) notify a surgeon of the periods when the probe is stable relative to the cavity boundary,
      (iv) identify stability sites based on the periods when probe speed is below a predetermined speed threshold for at least a predetermined time threshold,
      (v) generate respiration indicators based on the respiration data from the at least one sensor,
      (vi) convert the respiration indicators by using singular value decomposition (SVD) to obtain a first Eigenvector and a first Eigenvector derivative, the first Eigenvector corresponding to a primary respiration signal and the first Eigenvector derivative corresponding to a phase shifted respiration signal, and (vii) report an indicia based on the primary respiration signal and the phase shifted respiration signal to the surgeon.

11. The system according to claim 10, the processor being further configured to apply a filter to the respiration data and the probe location data.

12. The system according to claim 10, the primary respiration signal and the phase shifted respiration signal being transferred from two dimensions into a three-dimensional ellipsoid based on a correlation matrix.

13. The system according to claim 12, the correlation matrix being determined based on weighted factors including at least one of: (i) age of the respiration data; (ii) the probe speed; (iii) depth of respiration; or (iv) data obtained during ablation.

14. The system according to claim 10, the processor being further configured to:

(i) obtain probe-cavity motion data based on movement of the probe relative to the cavity; and (ii) estimate a correlation matrix based on the probe location data and the probe-cavity motion data.

15. The system according to claim 10, the processor being further configured to generate an image including estimated respiratory motion based on the respiration data, probe motion based on the probe location data, and probe-cavity motion based on the probe-cavity location data.

16. The system according to claim 10, notifying the surgeon of the periods when the probe is stable relative to the cavity boundary including displaying visual indicators on a monitor.

17. The system according to claim 10, the predetermined speed threshold being less than 2.5 mm/second and the predetermined time threshold is at least three seconds.

* * * * *